(12) United States Patent
Jeong

(10) Patent No.: US 9,475,401 B2
(45) Date of Patent: *Oct. 25, 2016

(54) MANAGEMENT OF ELECTRIC POWER DEMAND IN ELECTRIC VEHICLE CHARGING STATIONS

(71) Applicant: KT CORPORATION, Gyeonggi-do (KR)

(72) Inventor: Myung-Ho Jeong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,782

(22) Filed: Nov. 16, 2015

(65) Prior Publication Data

US 2016/0075248 A1    Mar. 17, 2016

Related U.S. Application Data

(63) Continuation of application No. 14/143,092, filed on Dec. 30, 2013, now Pat. No. 9,227,522.

(30) Foreign Application Priority Data

Jan. 2, 2013 (KR) .......................... 10-2013-0000119

(51) Int. Cl.
*H02J 7/00* (2006.01)
*H02J 7/04* (2006.01)
*G01R 11/56* (2006.01)
(Continued)

(52) U.S. Cl.
CPC .......... *B60L 11/1844* (2013.01); *B60L 11/184* (2013.01); *B60L 11/1842* (2013.01); *B60L 11/1848* (2013.01); *G06Q 50/06* (2013.01); *B60L 2260/50* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/167* (2013.01); *Y02T 90/169* (2013.01); *Y04S 10/126* (2013.01); *Y04S 30/14* (2013.01)

(58) Field of Classification Search
CPC .............. B60L 11/184; B60L 11/1842; B60L 11/1844; G06Q 50/06
USPC .................................. 320/109, 162; 705/412
See application file for complete search history.

(56) References Cited

U.S. PATENT DOCUMENTS 8,498,763 B2 * 7/2013 Hafner .................... B60L 8/003
701/22
8,872,379 B2 * 10/2014 Ruiz ................... B60L 11/1816
307/66

(Continued)

FOREIGN PATENT DOCUMENTS

JP       2012-248191 A    12/2012
KR    10-2011-0090184 A    8/2011

(Continued)

*Primary Examiner* — M'Baye Diao
(74) *Attorney, Agent, or Firm* — IP Legal Services, LLC

(57) ABSTRACT

The disclosure is related to managing an electric power demand in one or more electric vehicle (EV) charging stations by adjusting a charging condition including charging levels and/or charging prices. Particularly, the charging condition may be adjusted according to a proximity degree between a target power usage amount and a current/predicted power usage amount.

22 Claims, 12 Drawing Sheets

(51) Int. Cl.
*B60L 11/18* (2006.01)
*G06Q 50/06* (2012.01)

(56) References Cited

U.S. PATENT DOCUMENTS

2004/0128266 A1* 7/2004 Yellepeddy ............ G05B 15/02
 705/412
2006/0005736 A1* 1/2006 Kumar ................ B60L 11/1801
 105/1.4
2012/0303553 A1 11/2012 LaFrance
2012/0310860 A1* 12/2012 Kim ....................... G06Q 30/08
 705/412

FOREIGN PATENT DOCUMENTS

| KR | 10-1133934 B1 | 4/2012 |
| KR | 10-2012-0075610 A | 7/2012 |
| KR | 10-2012-0114435 A | 10/2012 |

* cited by examiner

MANAGEMENT OF ELECTRIC POWER DEMAND IN ELECTRIC VEHICLE CHARGING STATIONS

CROSS REFERENCE TO PRIOR APPLICATIONS

The present application is continuation application of U.S. patent application Ser. No. 14/143,092 (filed on Dec. 30, 2013), which claims priority under 35 U.S.C. §119 to Korean Patent Application No. 10-2013-0000119 (filed on Jan. 2, 2013).

TECHNICAL FIELD

The present disclosure relates to an electric power demand management and, in particular, to managing an electric power demand in one or more electric vehicle (EV) charging station by adjusting charging levels and/or prices.

BACKGROUND

A typical power network is a one-way electric power network performing four steps which include (i) an electric power generation, (ii) an electric power transmission, (iii) an electric power distribution, and (iv) an electric power sale (or an electric power consumption).

In order to enhance an energy efficiency of the typical power network, a smart grid corresponding to an intelligent electric power network has been introduced. More specifically, the smart grid may enable two-way communications between an energy provider (e.g., an electric power provider) and energy consumers by incorporating an information technology (IT) to an existing one-way electric power network. Accordingly, the smart grid may enable the energy provider and the energy consumers to exchange information in real time, thereby optimizing energy efficiency.

A basic objective of the smart grid is to provide an efficient electric power system in which power plants, transmission and distributions facilities, and energy consumers may be connected each other through two-way communication networks, and therefore information may be shared therebetween. That is, a basic objective of the smart grid is to enable an entire electric power system to be systematically or organically operated like one body (i.e., one entity).

Recently, in order to efficiently utilize limited energy resources, many countries are trying to establish a smart grid in which energy and any information related to the energy may be shared between an energy provider and energy consumers through two-way communications. A typical energy policy corresponding to a supply-centered policy has been changing to 'an energy demand management policy' due to an active two-way power management of a smart grid.

For the energy demand management, stabilizing power demand/supply is a main issue. Accordingly, a demand response (DR) has been introduced to reduce energy loss by more efficiently utilizing energy. Herein, the demand response (DR) may refer to changes in power usage by an energy consumer from his/her normal consumption patterns in response to a variety of incentives and motivations.

Recently, a variety of schemes of managing load (or an electric power demand) through a demand response (DR) market have been introduced. In this case, if a demand response (DR) market announces a demand response (DR) event, users may participate in a bidding procedure with a target power reduction amount (i.e., a target reduction in power usage achievable with a power demand management).

In order to vitalize such demand response (DR) market and increase an overall efficiency in a power consumption, finding of resources to which the demand response (DR) can be applied is very important. Electric vehicles are now increasing at a fast rate and may be a good candidate for the demand response resources. As the electric vehicles become more prevalent, electric power needs to operate the electric vehicles will take a big part in the overall power demand management. Particularly, to operate the electric vehicles, establishing infrastructures (e.g., electric vehicle charging stations) in many locations for charging the electric vehicles may be necessary. In response to a fast-growing electric vehicle adoption, more infrastructures will be built and the electric power consumed for charging the electric vehicles will be a significant portion of an overall power consumption in a country. For this, managing the electric power necessary to charge the electric vehicles will become an important issue in the general power demand and supply. Accordingly, an efficient power demand management directed to the electric vehicles may be required.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, an electric power demand management system may manage or control an electric power demand in one or more electric vehicle (EV) charging stations, by adjusting a charging condition including charging levels and/or charging prices. Particularly, the charging condition may be adjusted according to a proximity degree between a target power usage amount and a current/predicted power usage amount.

In accordance with at least one embodiment, a method may be provided for managing an electric power demand in one or more electric vehicle (EV) charging stations. The method may include determining a target power usage amount for the one or more EV charging stations; determining whether an electric power usage control is required, based on the target power usage amount and an electric power usage amount in the one or more EV charging stations; adjusting a charging condition including charging levels and a charging price per charging level when the electric power usage control is required; and providing the adjusted charging condition to corresponding EV users.

The target power usage amount may be applied for a demand management period associated with a demand response (DR) event. The electric power usage amount may include at least one of an accumulated current power usage amount and a predicted power usage amount.

The determining the target power usage amount may include determining a reference power demand amount based on an electric power usage history of the one or more EV charging stations, determining a target reduction amount for the one or more EV charging stations, and determining the target power usage amount by obtaining a difference between the reference power demand amount and the target reduction amount.

The reference power demand amount may be determined according to a customer baseline load (CBL) scheme.

The determining the target reduction amount may include determining a reduction amount based on the reference power demand amount if a demand response (DR) event is received, participating in a bidding process associated with the demand response (DR) event, using the reduction amount, and determining the target reduction amount as the reduction amount when receiving a successful bidding result from a demand management market operating system.

The determining the target reduction amount may include predetermining the target reduction amount to be applied for a specific time period in connection with a demand management market operating system.

In a case that the electric power demand is applied for two or more EV charging stations, the target power usage amount and the electric power usage amount may be determined as one value for all of the two or more EV charging stations.

The determining whether the electric power usage control is required may include measuring an accumulated current power usage amount within the demand management period, for the one or more EV charging stations, and determining a necessity of the electric power usage control according to a proximity degree between the target power usage amount and the accumulated current power usage amount.

The proximity degree may be determined based on a power margin calculated from a difference between the accumulated current power usage amount and the target power usage amount.

The determining whether the electric power usage control is required may include calculating a power margin from a difference between an accumulated current power usage amount and the target power usage amount, predicting the predicted power usage amount to be provided to a current charging electric vehicles and a waiting electric vehicle from a current time to an end time of the demand management period, determining a proximity degree by comparing the power margin and the predicted power usage amount, and determining a necessity of the electric power usage control according to the proximity degree.

The adjusting may include adjusting the charging condition according to a proximity degree of the electric power usage amount to the target power usage amount. Herein, a total discount amount to be applied to the one or more EV charging stations may be determined based on the proximity degree. The charging levels may be classified based on at least one of a charging time, a charging amount per unit time, and a waiting time for charging.

The adjusting may include adjusting the charging price per charging level, based on an expected demand response (DR) event profit such that a discount amount for each charging level is proportion to a corresponding charging time and is inverse proportion to a charging amount per unit time, and restricting a selection of a specific charging level at which a charging amount exceeds a specific threshold amount.

The target power usage amount may be a maximum electric power usage amount. The target power usage amount may be periodically measured.

The maximum electric power usage amount may be determined based on a power usage history for the one or more EV charging stations.

The maximum electric power usage amount may (i) be separately determined for each EV charging station, or (ii) be determined through a form of integration for all of the one or more EV charging stations.

The providing may include at least one of transmitting the adjusted charging condition to each electric charger or each EV charging station terminal, and transmitting the adjusted charging condition to user equipment corresponding to at least one of (i) a current charging electric vehicle and (ii) a waiting electric vehicle being within the demand management period.

The method may further include controlling at least one of a corresponding electric charger and a corresponding EV charging station terminal to apply a newly selected charging level, if a new user selection associated with the adjusted charging condition is received.

In accordance with still another embodiment of the present invention, a system may be provided for managing an electric power demand in one or more electric vehicle (EV) charging stations. The system may include a demand response (DR) event management processor, a power usage management processor, a charging condition setting processor, and an information providing processor. The demand response (DR) event management processor may be configured to determine a target power usage amount associated with a demand response (DR) event for the one or more EV charging stations. The power usage management processor may be configured to determine whether an electric power usage control is required, based on the target power usage amount and an electric power usage amount in the one or more EV charging stations. The charging condition setting processor may be configured to adjust a charging condition including charging levels and a charging price per charging level when the electric power usage control is required. The information providing processor may be configured to provide the adjusted charging condition to corresponding EV users.

The information providing processor may be configured to receive a new user selection associated with the adjusted charging condition is received. The power usage management processor may be configured to control at least one of a corresponding electric charger and a corresponding EV charging station terminal to apply the new user selection.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Figure 1:
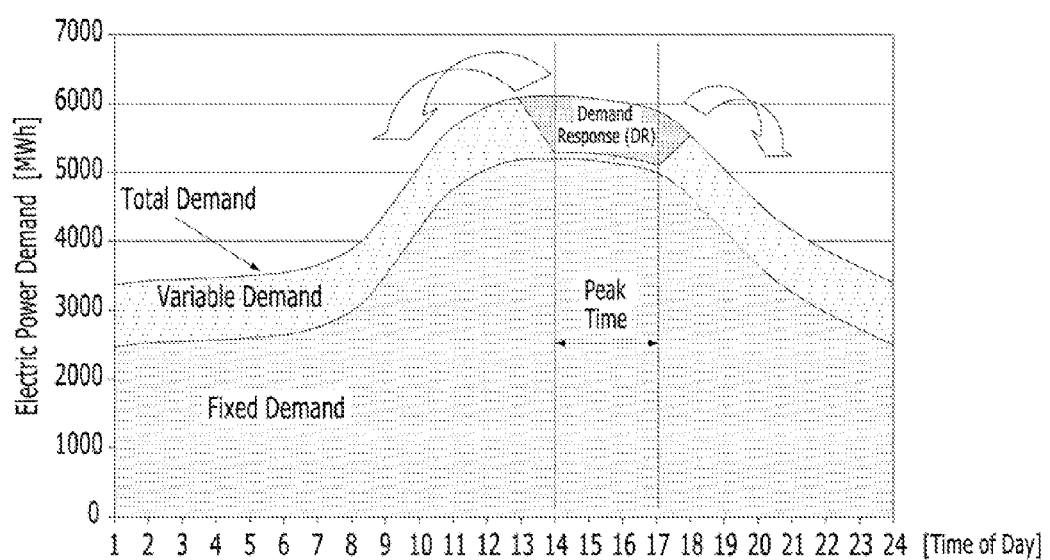
FIG. 1 illustrates a concept of a demand response (DR)

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

The present embodiment may manage or control an electric power demand in one or more electric vehicle (EV) charging stations by adjusting a charging condition including charging levels and/or charging prices. Particularly, the charging condition may be adjusted according to a proximity degree between a target power usage amount and a current/predicted power usage amount.

FIG. 1 illustrates a concept of a demand response (DR). The demand response (DR) may refer to changes in power usage by an energy consumer from his/her normal consumption patterns in response to a variety of incentive motivations. In order to induce such demand response, various energy policies have been introduced. Herein, the various energy policies may include providing incentives for reducing electric power consumption or different levels of price (e.g., a different price per time zone).

As shown in FIG. 1, in a case of energy supply emergency situations (e.g., in the case that there is a shortage of the power supply during on-peak hours), the demand response (DR) may be used to lower a peak power demand by relocating or suppressing the peak power demand. In this case, the demand response may ensure a reliability of an electric power system without enlarging a power generation capacity. In addition, in even case of normal situations, the demand response (DR) may be applied to reduce a power demand (or power consumption) at specific times when an electric power rate is high in an electric market. In this case, power providers may satisfy an electric power demand without increasing an electric power provision amount, and thereby reducing the costs for generating power.

Figure 2:
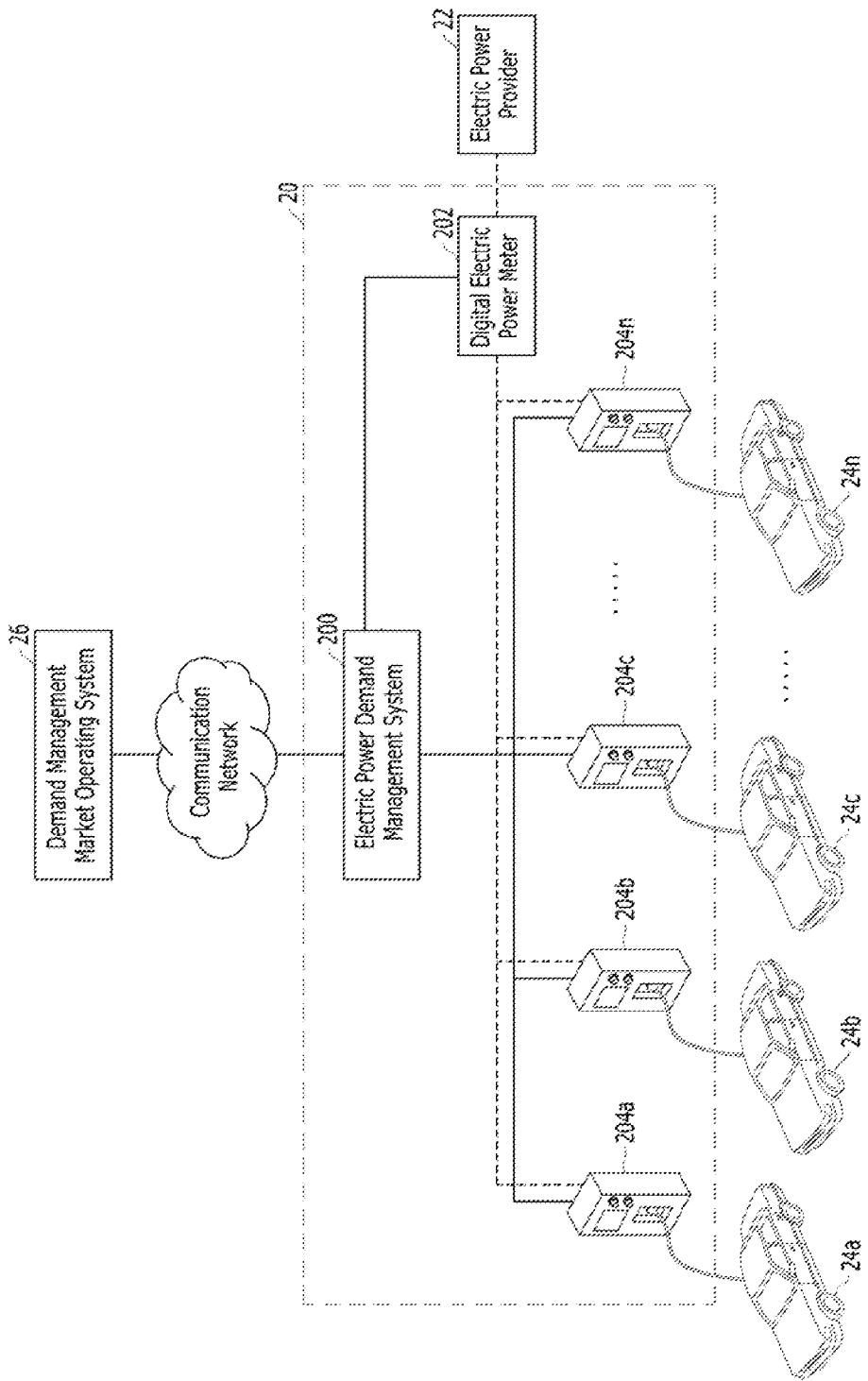
FIG. 2 illustrates an interworking between systems for managing an electric power demand to which the present embodiment is applied.

FIG. 2 illustrates an interworking between systems for managing an electric power demand to which the present embodiment is applied.

Referring to FIG. 2, electric power demand management system 200 may participate in a demand response (DR) event (e.g., an electric power demand response (DR) event) operated by demand management market operating system 26. Electric power demand management system 200 may manage an electric power demand in a specific electric vehicle (EV) charging station (e.g., electric vehicle (EV) charging station 20) by adjusting a charging condition including at least one of charging levels, charging prices, and a waiting time. Particularly, the charging condition may be adjusted according to a proximity degree to a target power usage amount determined in connection with the electric power demand response (DR) event. In other words, in order to achieve the target power usage amount, electric power demand management system 200 may adjust charging levels, and apply a discount on a charging price per charging level. In this case, a discount rate may differ according to a proximity degree of a power usage amount to the target power usage amount. More specifically, in the case that the target power proximity degree is larger, a power usage control for a corresponding electric vehicle (EV) charging station is required to be performed more actively. Accordingly, in this case, the more discount for users may be required to be applied. Meanwhile, a total discount amount to be applied for a corresponding electric vehicle (EV) charging station (e.g., EV charging station 20) may be a portion of a total expected DR event profit. Herein, the total expected DR event profit may be a profit which can be obtained when a target usage amount determined according to participation of a demand response (DR) event is achieved.

In addition, electric power demand management system 200 may measure (or obtain) an electric power usage through digital electric power meter 202 and/or electric chargers 204a through 204n (more specifically, individual electric power meters of electric chargers 204a through 204n). Herein, the electric power usage may include a total power usage amount of a corresponding electric vehicle (EV) charging station 20, and/or an individual power usage amount in each of electric chargers 204a through 204n. Electric power flowing through digital electric power meter 202 from electric power provider 22 may be provided to electric chargers 204a through 204n and/or electric power demand management system 200. Broken lines in FIG. 2 may indicate a flow of electric power, or electric power lines.

Furthermore, electric power demand management system 200 may manage or control operations of one or more electric chargers '204a' through '204n'. Particularly, electric power demand management system 200 may control electric chargers 204a through 204n to perform a charging process according to a charging condition (e.g., a regular charging condition and/or an adjusted charging condition).

Each of electric chargers 204a through 204n may include a display screen (e.g., a touch screen display unit) for displaying a charging condition and for receiving a user selection (e.g., a charging level selection of a user) and/or an individual electric power meter. Each of electric chargers 204a through 204n may be connected to electric power demand management system 200 through a wired communication network or a wireless communication network. Furthermore, each of electric chargers 204a through 204n may include a processor. Herein, the processor may communicate with electric power demand management system 200, perform a control command of electric power demand management system 200, and/or receive/process/transfer a user input information. Meanwhile, electric chargers 204a through 204n may charge electric vehicles (EVs) (e.g., 24a through 24n), using a wired charging scheme as shown in FIG. 2. In other embodiments, electric chargers 204a through 204n may charge electric vehicles (EVs) (e.g., 24a through 24n), using a wireless charging scheme.

Electric vehicles (EVs) may include electric cars, electric motorcycles, and/or electric motorbikes, but are not limited thereto.

Demand management market operating system 26 may (i) open and manage an electric power demand response market (may be referred to as "an electric power demand management market"), (ii) notify demand response (DR) events to corresponding users, manage a bidding process, (iii) evaluate an electric power usage reduction performed according to a participation in a demand response (DR), and/or (iv) give incentive according to an evaluation of electric power usage amount. Furthermore, demand management market operating system 26 may be operated by a demand management market operating subject (e.g., power exchange (PX) such as Korea power exchange (KPX)) or an electric power provider (e.g., an electric power company).

As shown in FIG. 2, an electric vehicle (EV) charging station (e.g., EV charging station 20) may indicate an operating entity performing an electric charging business through one or more electric chargers (e.g., 204a through 204n) which are deployed in a specific area. In other embodiments, an electric vehicle (EV) charging station may indicate a group of electric chargers which are distributed and deployed a various positions (e.g., roads, buildings, etc.) not being restricted to a specific area.

Meanwhile, an electric power demand management system may be configured to be dedicated to a corresponding electric vehicle (EV) charging station. For example, as shown in FIG. 2, electric power demand management system 200 may correspond to a dedicated system for managing an electric power demand of EV charging station 20. Furthermore, an electric power demand management system may be positioned in a geographical area of a corresponding electric vehicle (EV) charging station, but is not limited thereto. In other embodiments, an electric power demand management system may be positioned at a remote location, and be connected to charging facilities (e.g., an electric chargers, an electric power meter, etc.) of a corresponding electric vehicle (EV) charging station, through a wired/wireless telecommunication network. In this case, the corresponding electric vehicle (EV) charging station may include an electric vehicle (EV) charging station terminal (or may be referred to as "an EV charging station server") which enables a communication or data transmission between an electric power demand management system and electric chargers.

Figure 3:
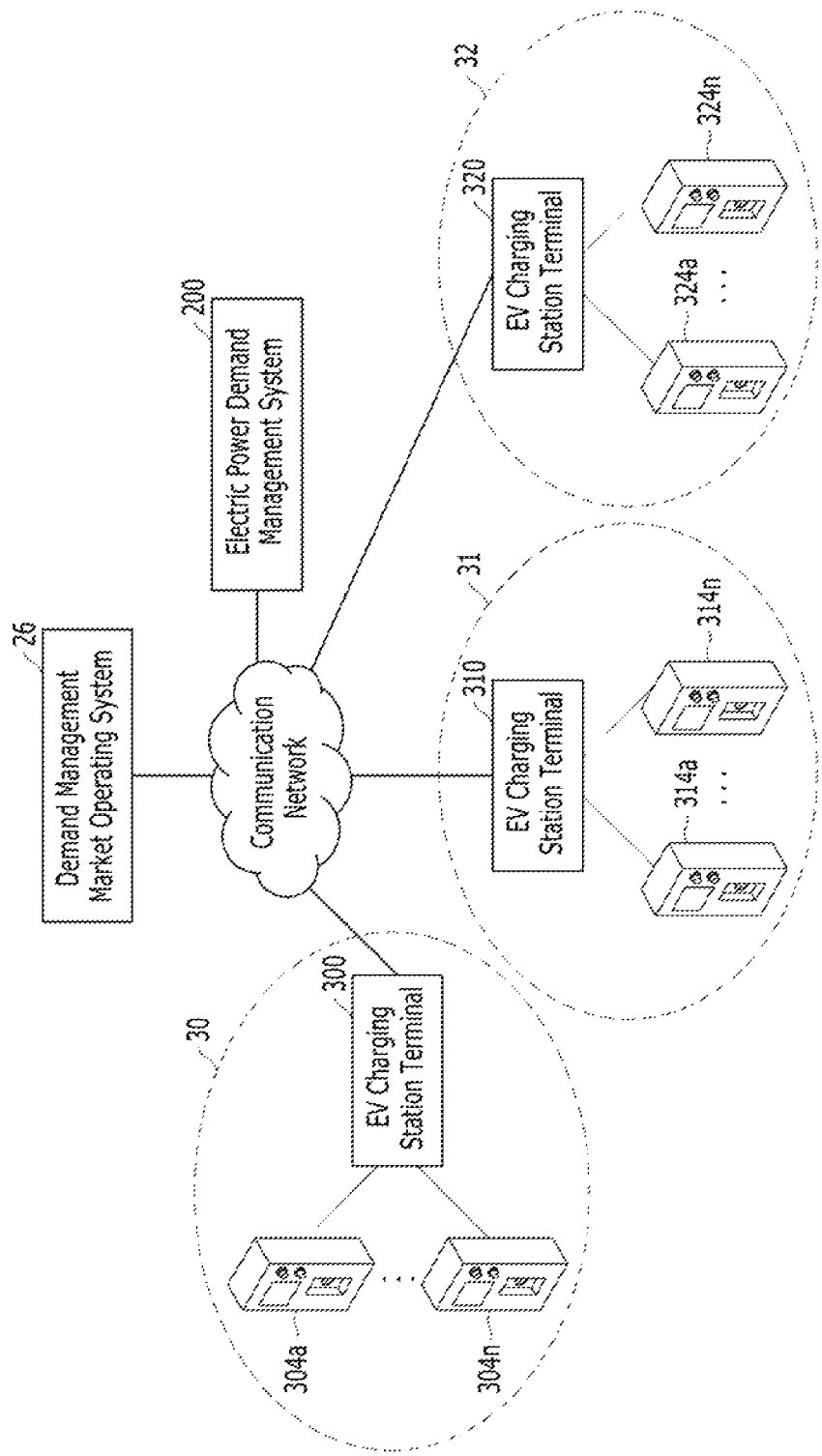
FIG. 3 illustrates an electric power demand management system for managing a power demand associated with a plurality of electric vehicle (EV) charging stations in accordance with at least one embodiment.

FIG. 3 illustrates an electric power demand management system for managing a power demand associated with a plurality of electric vehicle (EV) charging stations in accordance with at least one embodiment.

As shown in FIG. 3, electric power demand management system 200 may separately, independently, or through a form of integration manage a power demand associated with a plurality of electric vehicle (EV) charging stations 30, 31, and 32.

In at least one embodiment, electric power demand management system 200 may separately or independently manage each of the plurality of electric vehicle (EV) charging stations 30, 31, and 32. In this case, electric power demand management system 200 may participate in a bidding process operated by demand management market operating system 26, in order to perform a power demand management for each electric vehicle (EV) charging station 30, 31, or 32.

Particularly, parameters (e.g., a reference power demand amount, a target reduction amount, a target power usage amount, a power margin, a predicted power usage amount, a proximity degree, a maximum power usage amount, and so forth) associated with a power demand management may be separately (or independently) calculated or obtained for each electric vehicle (EV) charging station 30, 31, or 32.

In other embodiments, electric power demand management system 200 may through a form of integration manage a power demand associated with the plurality of electric vehicle (EV) charging stations 30, 31, and 32. In this case, electric power demand management system 200 may register and manage the plurality of electric vehicle (EV) charging stations 30, 31, and 32 as subscribers (or members) of a power demand management service. Furthermore, electric power demand management system 200 may participate in a bidding process in order to perform a power demand management for electric vehicle (EV) charging station 30, 31, and 32. In other words, a plurality of electric vehicle (EV) charging stations (30, 31, and 32) may be treated as a single integrated electric vehicle (EV) charging station. Accordingly, parameters (e.g., a reference power demand amount, a target reduction amount, a target power usage amount, a power margin, a predicted power usage amount, a proximity degree, a maximum power usage amount, and so forth) associated with a power demand management may be calculated or obtained as a single value for all of the electric vehicle (EV) charging station 30, 31, and 32.

Referring to FIG. 3, each of electric vehicle (EV) charging stations 30, 31, and 32 may include electric vehicle (EV) charging station terminal (i.e., an EV charging station server) 300, 310, or 320 which enables a communication or data transmission between electric power demand management system 200 and electric chargers 304a through 324n.

Hereinafter, for convenience of descriptions, operations of electric power demand management system 200 will be described in connection with one electric vehicle (EV) charging station, but is not limited thereto. In other words, embodiments described later may be applied to a case that a plurality of electric vehicle (EV) charging stations are separately, independently, or through a form of integration managed or controlled for a power demand management.

Figure 4:
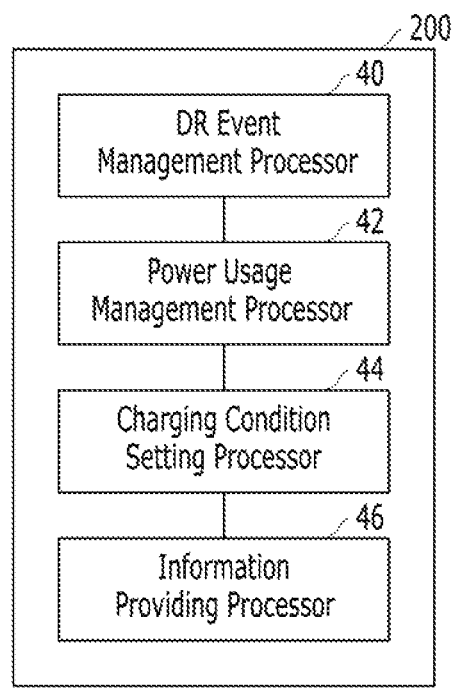
FIG. 4 illustrates an electric power demand management system in accordance with at least one embodiment.
Figure 5:
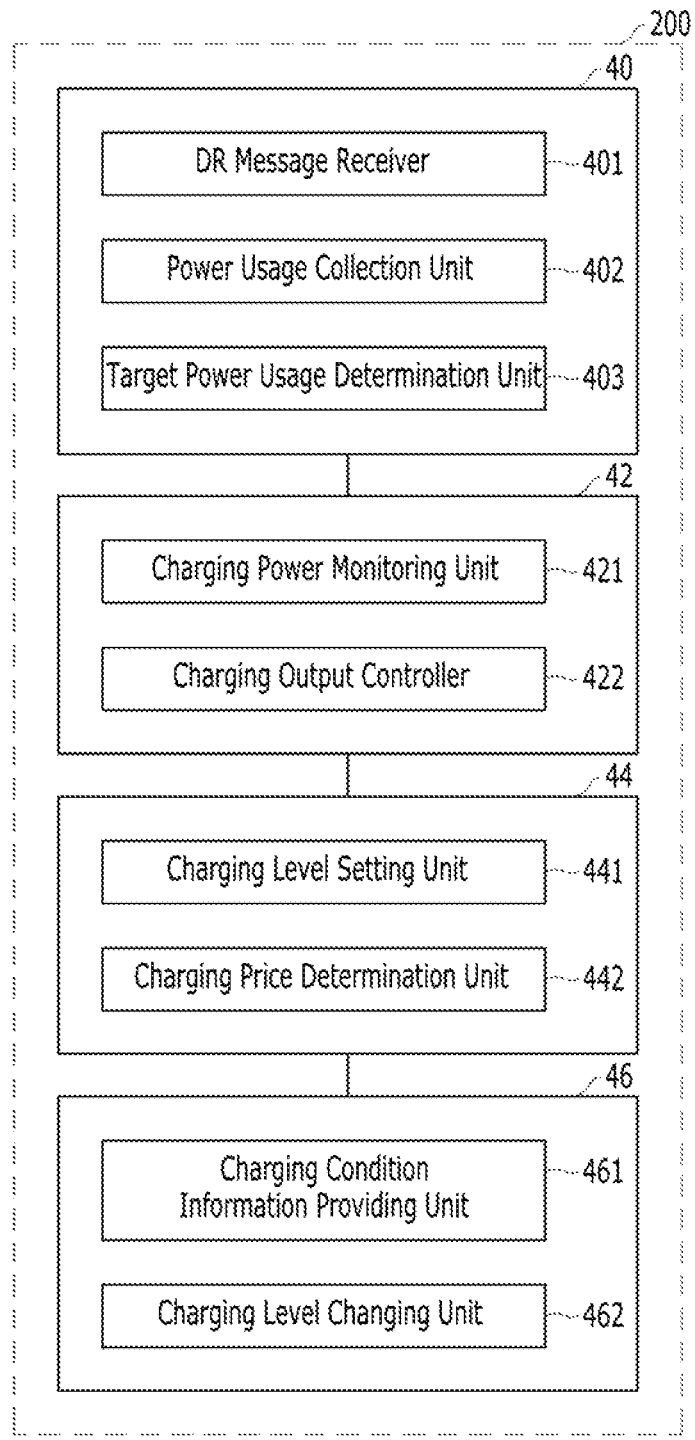
FIG. 5 illustrates a detailed structure of the electric power demand management system in accordance with at least one embodiment.

FIG. 4 illustrates an electric power demand management system in accordance with at least one embodiment. FIG. 5 illustrates a detailed structure of the electric power demand management system in accordance with at least one embodiment. That is, FIG. 5 illustrates a detailed structure of electric power demand management system 200 shown in FIG. 4.

As shown in FIG. 4, electric power demand management system 200 may include demand response (DR) event management processor 40, power usage management processor 42, charging condition setting processor 44, and information providing processor 46. Electric power demand management system 200 may perform operations described later with reference to FIG. 6 through FIG. 11. Accordingly, the detailed descriptions thereof will be omitted herein. Each constituent element of electric power demand management system 200 will be briefly described.

DR event management processor 40 may receive or obtain information on a demand response (DR) event from demand management market operating system 26, participate in a bidding process associated with the received demand response (DR) event, and/or determine a target power usage amount for one or more electric vehicle (EV) charging stations. In other embodiments, DR event management processor 40 may separately, independently, or through a form of integration determine a maximum power usage amount (i.e., a peak power usage amount) corresponding to a target power usage amount, as described later in FIG. 11. More specifically, DR event management processor 40 may determine the maximum power usage amount based on a power usage history associated with a corresponding electric vehicle (EV) charging station, regardless of power demand response (DR) events.

More specifically, as shown in FIG. 5, DR event management processor 40 may include DR message receiver 401, power usage collection unit 402, and target power usage determination unit 403. Herein, DR message receiver 401 may receive DR messages (e.g., a DR event notice message, a bidding result notification message, a demand management execution notification message, and so forth) from demand management market operating system 26 which opens and manages a DR market, and obtain information on a demand response (DR) event from the received DR messages. Furthermore, DR message receiver 401 may perform an DR event participation procedure. Power usage collection unit 402 corresponding to a sub-processor may collect electric power usage information (e.g., an electric power usage amount for a specific time period, and/or a real-time electric power usage amount) in one or more electric vehicle (EV) charging stations. Target power usage determination unit 403 corresponding to a sub-processor may determine (or calculate) a reference power demand amount (e.g., a reference power demand amount for a predetermined time period) by analyzing an electric power usage pattern for one or more electric vehicle (EV) charging stations, based on the electric power usage information collected by power usage collection unit 402. For example, the reference power demand amount may be calculated according to a variety of 'customer baseline load (CBL)' schemes. Furthermore, target power usage determination unit 403 may determine a target reduction amount (i.e., a target power amount to be reduced in electric power consumption), based on the determined reference power demand amount. Target power usage determination unit 403 may determine a target power usage amount for a power demand management execution according to a DR event participation. Such a determination procedure of the target power usage amount will be described in more detail with reference to FIG. 6 and FIG. 7. In other embodiments, target power usage determination unit 403 may separately, independently, or through a form of integration determine a maximum power usage amount (i.e., a peak power usage amount) as described later in FIG. 11. In this case, the maximum power usage amount may correspond to target power usage amount. More specifically, DR event management processor 40 may determine the maximum power usage amount based on a power usage history associated with a corresponding electric vehicle (EV) charging station, regardless of power demand response (DR) events.

Meanwhile, power usage management processor 42 may monitor (or measure) in real time or periodically an electric power usage amount in one or more electric vehicle (EV) charging stations by interworking with charging facilities (e.g., electric chargers, EV charging station terminals, an electric power meter, etc.). Power usage management processor 42 may determine whether an electric power usage of one or more corresponding electric vehicle (EV) charging stations is required to be controlled, based on the monitoring results. Power usage management processor 42 may generate a control signal for controlling electric chargers according to an adjusted charging condition (e.g., charging levels, and/or charging prices) if an electric power usage is required to be controlled.

More specifically, as shown in FIG. 5, power usage management processor 42 may include charging power monitoring unit 421 and charging output controller 422. Herein, charging power monitoring unit 421 may monitor (or measure) in real time or periodically an electric power usage amount in one or more electric vehicle (EV) charging stations. For example, charging power monitoring unit 421 corresponding to a sub-processor may measure or monitor an electric power usage amount using a digital electric power meter (e.g., 202) deployed in a corresponding electric vehicle (EV) charging station (e.g., "20" in FIG. 2). Furthermore, charging power monitoring unit 421 may predict an electric power demand for a specific time period (e.g., a demand management period), based on charging conditions (e.g., charging levels, for example, a charging time and/or a charging amount) associated with electric vehicles which are currently being charged and are waiting for charging. Accordingly, charging power monitoring unit 421 may determine whether an electric power usage of one or more corresponding electric vehicle (EV) charging stations is required to be controlled, based on an electric power usage amount (e.g., an accumulated current power usage amount and/or a predicted power usage amount). Such a determination procedure of requirements of a power usage control will be described in more detail with reference to FIG. 8, FIG. 9A, FIG. 9B, FIG. 11, and FIG. 12. Charging output controller 422 corresponding to a sub-processor may generate a control signal for controlling an electric charger, according to charging levels.

Meanwhile, if an electric power usage of an electric vehicle (EV) charging station is required to be controlled, charging condition setting processor 44 may set or adjust a plurality of different charging levels, and may determine a charging price per charging level.

More specifically, as shown in FIG. 5, charging condition setting processor 44 may include charging level setting unit 441 and charging price determination unit 442. Herein, charging level setting unit 441 corresponding to a sub-processor may set or adjust a plurality of different charging levels. Herein, charging levels may be classified based on at least one of (i) a charging time (i.e., a time to be taken for charging), (ii) a charging amount (i.e., output electric power for charging) for a unit time, and (iii) a waiting time for charging. For example, as described later in Table 1, charging levels may be set or adjusted such that a higher charging level has a shorter charging time and the more charging amount (i.e., a higher power out) for a unit time. Charging time/amount gaps between charging levels may be adjusted based on an electric power usage amount (e.g., a real-time electric power usage amount, a predicted power usage amount) and/or a target power usage amount. Charging price determination unit 442 corresponding to a sub-processor may determine a charging price for each of the charging levels set/adjusted by charging level setting unit 441. In this case, as described later in Table 1, charging price determination unit 442 may determine a charging price per charging level such that a higher charging level has a higher price. Such a setting/adjustment procedure of a charging condition will be described in more detail with reference to FIG. 8 and FIG. 11.

Meanwhile, information providing processor 46 may provide information on a charging condition (e.g., a regular charging condition, an adjusted charging condition, etc.) to users of a corresponding electric vehicle (EV) charging station, in order to induce an active participation of the users. More specifically, as shown in FIG. 5, information providing processor 46 may include charging condition information providing unit 461 and charging level changing unit 462. Herein, charging condition information providing unit 461 corresponding to a sub-processor may provide charging condition information through a display screen of an electric charger, a messaging scheme (e.g., an SMS transmission), and other notification scheme. Particularly, charging condition information providing unit 461 may transmit the charging condition information to corresponding user equipment (e.g., user equipment of EV users being using a corresponding electric vehicle (EV) charging station). Herein, the charging condition information may include charging levels, a charging price per charging level, a charging time per charging level, and/or a charging amount per charging level.

Users of a current charging electric vehicle and/or a waiting charging electric vehicle may input (i) electric vehicle (EV) identification information (e.g., a vehicle plate number), (ii) user contact information (e.g., a telephone number, an email address, etc.), and/or (iii) charging condition information such as charging level selection information, through an electric charger. In this case, the electric charger may transmit the input information to electric power demand management system 200. Electric power demand management system 200 (more specifically, charging condition information providing unit 461) may store and manage the transmitted information. In other embodiment, users may directly register the above information (e.g., electric vehicle (EV) identification information, user contact information, charging condition information such as charging level selection information, etc.) to electric power demand management system 200. Accordingly, in the case that the above information is stored and managed in charging condition information providing unit 461, charging condition information providing unit 461 may transmit the adjusted charging condition information to using a messaging scheme (e.g., a text message such as an SMS, an email, and so forth) to corresponding user equipment. Herein, the corresponding user equipment may be user equipment corresponding to a current charging electric vehicle and a waiting electric vehicle (e.g., a waiting electric vehicle being within a demand management period).

Users may select a different charging level on a display screen of an electric charger, and/or transmit selection information (e.g., charging level selection information) to charging level changing unit 462, using user equipment. In this case, charging level changing unit 462 corresponding to a sub-processor may receive the selection information (e.g., charging level selection information) from the user equipment and/or the electric charger, and transfer the received selection information to power usage management processor 42. Power usage management processor 42 may change an existing charging level to a new charging level corresponding to the received selection information. Such providing/ changing procedures of a charging condition will be described in more detail with reference to FIG. 8, FIG. 10, and FIG. 11.

Figure 6:
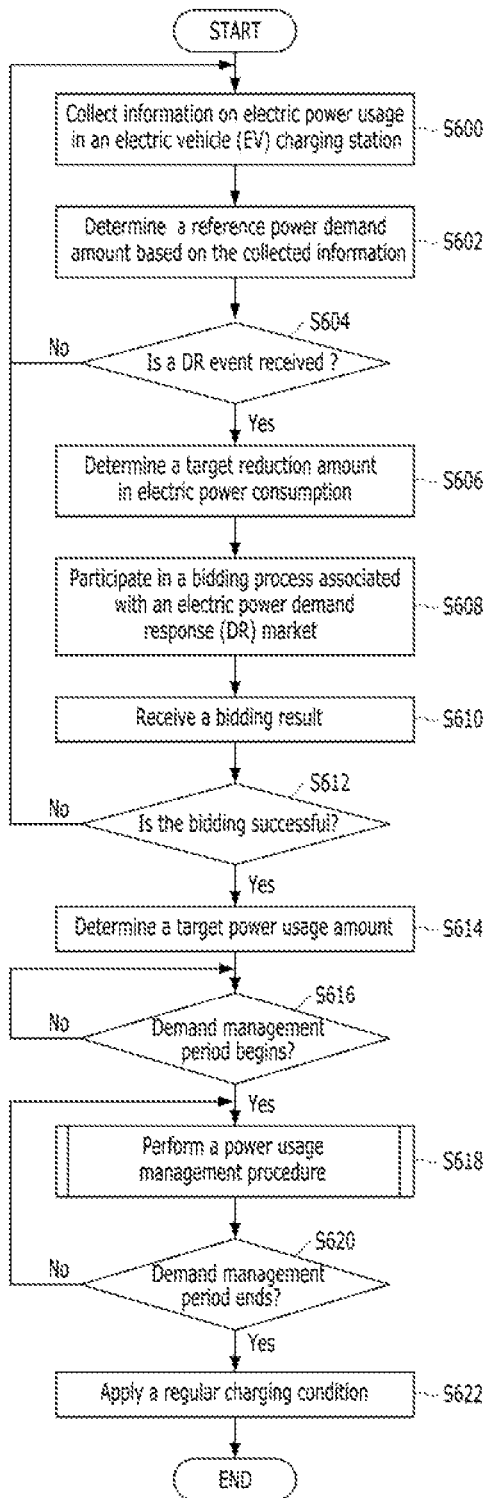
FIG. 6 illustrates a method of managing an electric power demand for an electric vehicle (EV) charging station in the case that a variable target reduction amount is applied, in accordance with at least one embodiment.

FIG. 6 illustrates a method of managing an electric power demand for an electric vehicle (EV) charging station in the case that a variable target reduction amount is applied, in accordance with at least one embodiment.

Referring to FIG. 6, at step S600, electric power demand management system 200 may collect and manage information on electric power usage in an electric vehicle (EV) charging station. Particularly, electric power demand management system 200 may collect charging power usage information periodically or in real time. Herein, the charging power usage information may include a total power usage amount associated with a corresponding electric vehicle (EV) charging station. The total power usage amount may be obtained from an electric power meter (e.g., 202).

At step S602, electric power demand management system 200 may determine a reference power demand amount, based on the collected charging power usage information. For example, the reference power demand amount may be calculated according to a variety of 'customer baseline load (CBL)' schemes. In this case, the reference power demand amount may be an arithmetic mean of historical power usage data, and be calculated in a unit of a predetermined time period. For example, the reference power demand amount may be obtained by calculating an arithmetic mean value of electric power usage amount for the past 10 business days, in a unit of 15 minutes.

As described above, electric power demand management system 200 may perform operations S600 and S602 periodically or in real time in order to rapidly participate in a power demand response (DR) event.

At step S604, electric power demand management system 200 may monitor whether a demand response (DR) event is received from demand management market operating system 26.

At step S606, when the demand response (DR) event is received (Yes—S604), electric power demand management system 200 may determine a target reduction amount (i.e., a target power amount to be reduced in electric power consumption), based on the reference power demand amount determined at step S602. When a demand response (DR) event is not received (No—S604), electric power demand management system 200 may repeatedly perform operations S600 and S602 until a certain demand response (DR) event is received.

At step S608, electric power demand management system 200 may participate in a bidding process associated with an electric power demand response (DR) market, using the target reduction amount. In other words, electric power demand management system 200 may send the target reduction amount and a corresponding bidding price to demand management market operating system 26.

At step S610, electric power demand management system 200 may receive a bidding result from demand management market operating system 26. Herein, the bidding result may include (i) whether the bidding is successful and/or (ii) a demand management period (or may be referred to "power demand management period" or "DR event period").

At step S612, electric power demand management system 200 may check whether the bidding is successful, using the received bidding result message.

When the bidding is successful (Yes—S612), electric power demand management system 200 may determine a target power usage amount for a power demand management execution at step S614. Herein, the target power usage amount may be a difference between a corresponding reference power demand amount (i.e., a reference power demand amount corresponding to the demand management period) determined at step S602 and the target reduction amount determined at step S606. More specifically, the target power usage amount may be calculated by subtracting the target reduction amount from the reference power demand amount. In this case, a calculation scheme may be expressed as [target power usage amount=reference power demand amount−target reduction amount]. For example, in the case that a reference power demand amount corresponding to a demand management period is 110 kW and a target reduction amount is 10 kW, a target power usage amount may be 100 kW (=110 kW−10 kW).

Meanwhile, when the bidding fails (No—S612), electric power demand management system 200 may return to operation S600.

When a demand management period begins (Yes—S616), electric power demand management system 200 may perform a power usage management procedure at step S618. More specifically, electric power demand management system 200 may control an electric power demand for the demand management period by adjusting charging level and/or a charging price per charging level based on the target power usage amount and a power usage amount (e.g., a current power usage amount or a predicted power usage amount). Such power usage management procedure will be described in more detail with reference to FIG. 8. Furthermore, such power usage management procedure (S618) may be performed until the demand management period ends (Yes—S620).

At step S622, electric power demand management system 200 may apply a regular charging condition, when the demand management period ends (Yes—S620). Herein, the regular charging condition may include a regular charging level and a regular price. However, in the case that there are electric vehicles to which an adjusted charging condition is being applied or is determined to be applied at the time when the demand management period ends, electric power demand management system 200 may apply the adjusted charging condition to the corresponding electric vehicles. For example, in the case that a user changed a charging level (e.g., in Table 1, charging level 1→charging level 3 or charging level 5) during the demand management period, electric power demand management system 200 may apply the adjusted charging condition (e.g., charging level 3 or charging level 5) to a corresponding electric vehicle of the user although the demand management period ends.

Figure 7:
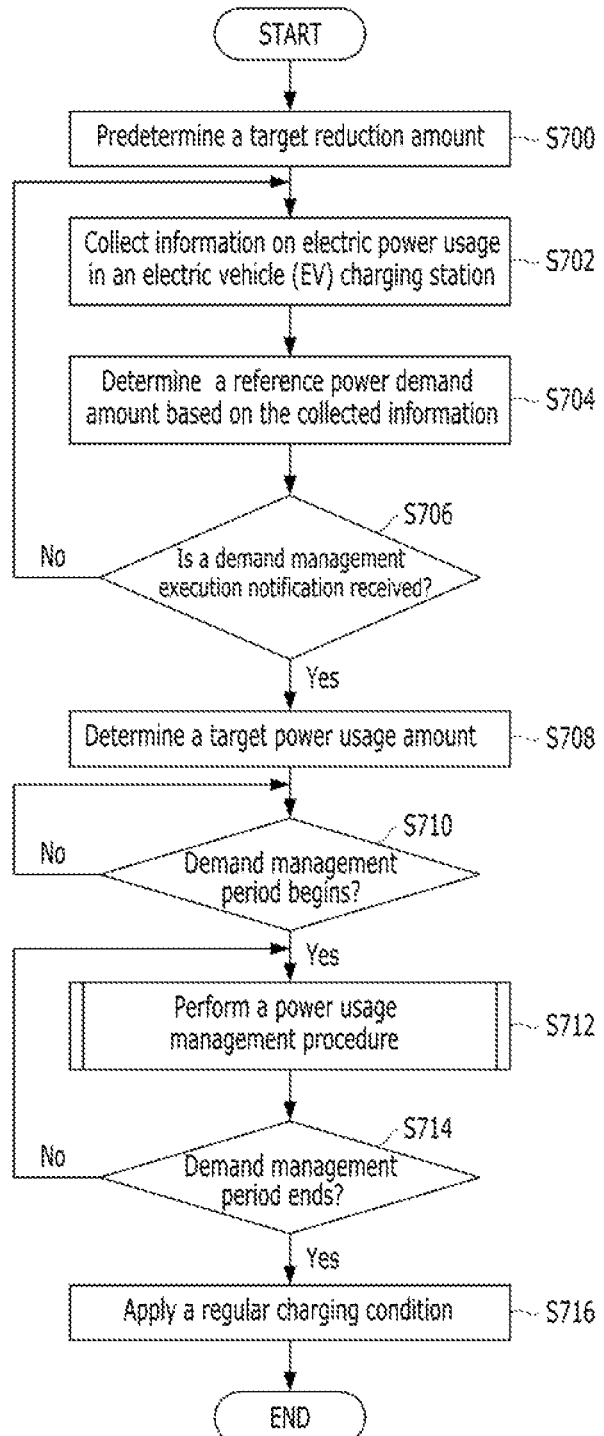
FIG. 7 illustrates a method of managing an electric power demand for an electric vehicle (EV) charging station in the case that a predetermined target reduction amount is applied, in accordance with at least one embodiment.

FIG. 7 illustrates a method of managing an electric power demand for an electric vehicle (EV) charging station in the case that a predetermined (i.e., fixed) target reduction amount is applied, in accordance with at least one embodiment. For example, the target reduction amount may be determined in a unit of a specific time period (e.g., one year) between an EV charging station operating subject and a demand management market operating subject (e.g., power exchange (PX) such as Korea power exchange (KPX)). In this case, electric power demand management system 200 may perform a power usage management procedure without participating in a bidding process.

Referring to FIG. 7, at step S700, electric power demand management system 200 may predetermine a target reduction amount in a unit of a specific time period in connection with demand management market operating system 26.

At step S702, electric power demand management system 200 may collect and manage information on electric power usage in an electric vehicle (EV) charging station. Particularly, electric power demand management system 200 may collect charging power usage information periodically or in real time. Herein, the charging power usage information may include a total power usage amount associated with a corresponding electric vehicle (EV) charging station. The total power usage amount may be obtained from an electric power meter (e.g., 202). Alternatively, the total power usage amount may be calculated using power usage information obtained from each electric charger.

At step S704, electric power demand management system 200 may determine a reference power demand amount, based on the collected charging power usage information. For example, the reference power demand amount may be calculated according to a variety of 'customer baseline load (CBL)' schemes.

At step S706, electric power demand management system 200 may monitor whether a demand management execution notification is received from demand management market operating system 26. Herein, the demand management execution notification may include a demand management period.

When the demand management execution notification is not received (No—S706), electric power demand management system 200 may repeatedly perform operations S702 and S704 until a certain demand management execution notification is received.

When the demand management execution notification is received (Yes—S706), electric power demand management system 200 may determine a target power usage amount for a power demand management execution at step S708. Herein, the target power usage amount may be a difference between the reference power demand amount determined at step S704 and the target reduction amount predetermined at step S700. More specifically, the target power usage amount may be calculated by subtracting the target reduction amount from the reference power demand amount. In this case, a calculation scheme may be expressed as [target power usage amount=reference power demand amount−target reduction amount].

When the demand management period begins (Yes—S710), electric power demand management system 200 may perform a power usage management procedure at step S712. More specifically, electric power demand management system 200 may control an electric power demand for the demand management period by adjusting charging level and/or a charging price per charging level based on the target power usage amount and a power usage amount (e.g., a current power usage amount or a predicted power usage amount). Such power usage management procedure will be described in more detail with reference to FIG. 8. Furthermore, such power usage management procedure (S712) may be performed until the demand management period ends (Yes—S714).

At step S716, electric power demand management system 200 may apply a regular charging condition, when the demand management period ends (Yes—S714). Herein, the regular charging condition may include a regular charging level and a regular price. However, as described in FIG. 6, in the case that there are electric vehicles to which an adjusted charging condition is being applied or is determined to be applied at the time when the demand management period ends, electric power demand management system 200 may apply the adjusted charging condition to the corresponding electric vehicles.

Figure 8:
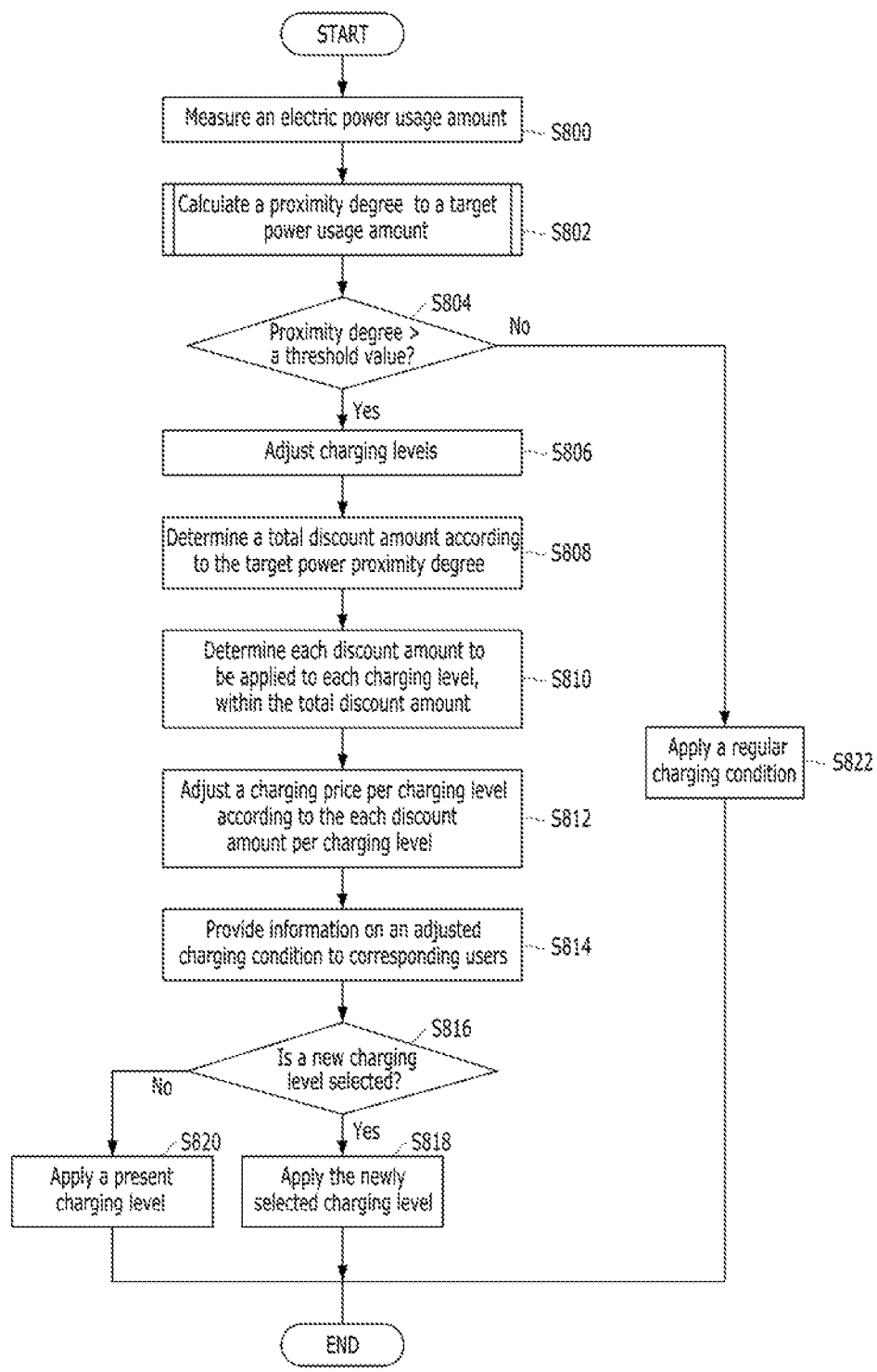
FIG. 8 illustrates a method of performing a power usage management according to a demand response (DR) event procedure in accordance with at least one embodiment.

FIG. 8 illustrates a method of performing a power usage management (e.g., S614, S708) according to a demand response (DR) event, in accordance with at least one embodiment. More specifically, such power usage management procedure (S618, S712) may be performed by adjusting a charging condition (e.g., charging levels and/or a charging price per charging level) according to a power use situation in an electric vehicle (EV) charging station.

Referring to FIG. 8, at step S800, electric power demand management system 200 may measure an electric power usage amount (e.g., an accumulated current power usage amount) periodically or in real time. In other words, electric power demand management system 200 may monitor periodically or in real time an electric power usage amount in a corresponding electric vehicle (EV) charging station.

At step S802, electric power demand management system 200 may calculate 'a proximity degree to a target power usage amount' (hereinafter referred to as "target power proximity degree"). More specifically, electric power demand management system 200 may calculate the target power proximity degree, based on (i) a power usage tendency according to a real-time power usage and/or (ii) the target power usage amount. Herein, the target power proximity degree may indicate a possibility that the target power usage amount can be achieved. Since a determination procedure of the target power usage amount for a power demand management execution was already described with reference to FIG. 6 (S614) and FIG. 7 (S708), the detailed description thereof is omitted. Furthermore, the target power proximity degree may be expressed as a numerical value. Particularly, the target power proximity degree may be used for determining whether a power usage control is required. For example, electric power demand management system 200 may calculate the target power proximity degree based on a measured electric power usage amount (e.g., an accumulated current power usage amount and/or a predicted power usage amount). Such a procedure of calculating the target power proximity degree will be described in more detail with FIG. 9A and FIG. 9B.

At step S804, electric power demand management system 200 may determine whether the target power proximity degree exceeds a threshold value. Such determination operation (S804) may be a procedure of determining whether a power usage of a corresponding electric vehicle (EV) charging station is required to be controlled. Herein, the threshold value may be a predetermined value. Alternatively, the threshold value may be dynamically determined. For example, the threshold value may be dynamically determined based on a power use situation in a corresponding electric vehicle (EV) charging station.

At step S806, when the target power proximity degree exceeds the threshold value (Yes—S804), electric power demand management system 200 may adjust (or redetermine) charging levels which are classified based on at least one of a charging time (i.e., a time to be taken for charging), a charging amount (i.e., output electric power for charging), and a waiting time for charging. Herein, an adjustment process of charging levels may include redetermination of charging levels and restriction of a specific charging level. More specifically, in the case that it is determined to be difficult to achieve the target power usage amount according to the target power proximity degree, electric power demand management system 200 may restrict a selection of a specific charging level (e.g., a high-speed charging level) at which a charging amount exceeds a specific threshold amount. For example, in the case that a failure possibility of the target power usage amount is high (e.g., a target power proximity degree is 80%), electric power demand management system 200 may restrict a selection of a high-speed charging level in a corresponding electric vehicle (EV) charging station. Accordingly, in this case, users can not select the restricted charging level. Meanwhile, in other embodiments, in the case that (i) a target power proximity degree is 100% or (ii) a power margin is zero ("0"), electric power demand management system 200 may apply a regular charging condition (e.g., a regular charging level and/or a regular charging price per charging level).

At step S808, electric power demand management system 200 may determine a total discount amount according to the target power proximity degree. Herein, the total discount amount may be a portion of a total expected DR event profit. The total expected DR event profit may be a profit which can be obtained when a target usage amount determined according to participation of a demand response (DR) event is achieved. Particularly, the total discount amount may be determined in proportion to the target power proximity degree. For example, in the case that the target power proximity degree is greater than or equal to 95%, the total discount amount may be determined as an amount corresponding to 70% of the total expected DR event profit. In the case that the target power proximity degree is greater than or equal to 90% and also less than 95%, the total discount amount may be determined as an amount corresponding to 40% of the total expected DR event profit. In summary, in the case that the target power proximity degree is larger, a power usage control for a corresponding electric vehicle (EV) charging station is required to be performed more actively. Accordingly, in this case, the more discount for users may be required to be applied.

At step S810, electric power demand management system 200 may determine each discount amount to be applied to each charging level, within the total discount amount. For example, a discount amount to be applied to each charging level may be determined in proportion to a charging time of a charging level. In other words, a discount amount to be applied to each charging level may be determined in inverse proportion to a charging amount per unit time (e.g., kWh). In order to induce active participation of users, different discount amounts may be applied to each charging level. For example, in a case of level 2 corresponding to a middle charging speed (e.g., 2 hours of charging time), a discount amount may be 30 cents/kWh. In a case of level 3 corresponding to a low charging speed (e.g., 4 hours of charging time), a discount amount may be 60 cents/kWh. Furthermore, if an electric vehicle user waits a predetermined waiting time without charging his/her electric vehicle, electric power demand management system 200 may provide (or apply) an additional discount. For example, in the case that a real-time power usage amount increases rapidly and reaches a peak value, electric power demand management system 200 may provide an additional discount, in order to minimize a power usage through an active participation of electric vehicle users.

At step S812, electric power demand management system 200 may adjust (or set) a charging price per charging level according to the each discount amount per charging level. For example, charging prices for a plurality of charging levels may be determined as shown in Table 1 blow.

TABLE 1

| Charging Level | Regular case | | Adjustment case of power usage | |
|---|---|---|---|---|
| | Charging Speed (Charging Time) | Charging Price | Charging Speed (Charging Time) | Charging Price |
| Level 1 | High speed (10 minutes) | 20 cents/kWh | High speed (10 minutes) | 20 cents/kWh |

TABLE 1-continued

| | Regular case | | Adjustment case of power usage | |
|---|---|---|---|---|
| Charging Level | Charging Speed (Charging Time) | Charging Price | Charging Speed (Charging Time) | Charging Price |
| Level 2 | Middle speed (2 hours) | 18 cents/kWh | Middle speed (2 hours) | 15 cents/kWh |
| Level 3 | Low speed (4 hours) | 16 cents/kWh | Low speed (4 hours) | 10 cents/kWh |
| Level 4 | | | Level 2 + waiting time (30 minutes) | Price of level 2 - Additional discount (10 cents/kWh) |
| Level 5 | | | Level 2 + waiting time (10 minutes) | Price of level 2 - Additional discount (5 cents/kWh) |
| Level 6 | | | Level 3 + waiting time (24 minutes) | Price of level 2 - Additional discount (5 cents/kWh) |

In Table 1, "regular case" indicates a case that an electric power usage is not required to be controlled or adjusted. "Adjustment case of power usage" indicates a case that an electric power usage is required to be controlled or adjusted according to the present embodiment. As shown in Table 1, more discount may be applied in order to induce a reduction of power usage.

At step S814, electric power demand management system 200 may provide information on an adjusted (changed) charging condition to corresponding users. In other words, the adjusted (changed) charging condition may be provided to the corresponding users such that the corresponding users may select a new charging level. Herein, the adjusted charging condition information may include adjusted charging levels and/or an adjusted charging price per charging level (e.g., charging levels shown in Table 1 above). Alternatively, the adjusted charging condition information may include only charging levels having a lower charging price and a lesser charging amount compared to a present charging condition. With respect to providing information on the adjusted charging condition, electric power demand management system 200 may provide the charging condition information through a display screen of an electric charger (e.g., 204a, 204b, . . . , 204n) of corresponding electric vehicle (EV) charging station 20. Furthermore, electric power demand management system 200 may transmit the adjusted charging condition information to electric vehicle (EV) charging station terminals (e.g., 300, 310, 320) such that electric chargers (304a, . . . , 304n; 314a, . . . , 314n; 324a, . . . , 324n) of corresponding electric vehicle (EV) charging station 30, 31, and 32 may display the adjusted charging condition information. In this case, a corresponding user may select a desired charging level (e.g., level 3 in Table 1) different from a current charging level (e.g., level 1 in Table 1), on the display screen. Alternatively, electric power demand management system 20 may provide (i.e., transmit) the adjusted charging condition information using a messaging scheme (e.g., a text message such as an SMS, an email, and so forth) to corresponding user equipment. More specifically, users of a current charging electric vehicle and/or a waiting charging electric vehicle may input (i) electric vehicle (EV) identification information (e.g., a vehicle plate number), (ii) user contact information (e.g., a telephone number, an email address, etc.), and/or (iii) charging condition information such as charging level selection information, through an electric charger. In this case, the electric charger may transmit the input information to electric power demand management system 200. Electric power demand management system 200 may store and manage the transmitted information. In other embodiment, users may directly register the above information (e.g., electric vehicle (EV) identification information, user contact information, charging condition information such as charging level selection information, etc.) to electric power demand management system 200. Accordingly, in the case that the above information is stored and managed in electric power demand management system 200, electric power demand management system 200 may transmit the adjusted charging condition information to using a messaging scheme (e.g., a text message such as an SMS, an email, and so forth) to corresponding user equipment. Herein, the corresponding user equipment may be user equipment corresponding to a current charging electric vehicle and a waiting electric vehicle (e.g., a waiting electric vehicle being within a demand management period). Such information input/registration procedure may be applied to embodiments shown in FIG. 10 and FIG. 11.

At step S816, electric power demand management system 200 may determine whether a new charging level is selected. In the case that a new charging condition (i.e., an adjusted charging condition) is provided to corresponding users, each of the corresponding users may transmit selection information to electric power demand management system 200. For example, in the case that user equipment receives a message (hereinafter referred to as "charging condition change notification message") including a new charging condition, user equipment may send a response message (i.e., a response message to the charging condition change notification message) to electric power demand management system 200. Herein, the response message may include information on a different charging level newly selected by a corresponding user. In other embodiments, each of the corresponding users may select a new charging level on a display screen of a corresponding electric charger.

When a new charging level is selected (Yes—S816), electric power demand management system 200 may apply the newly selected charging level at step S818. In other words, electric power demand management system 200 may apply a charging price and an output electric power according to the newly selected charging level. More specifically, electric power demand management system 200 may transmit a control signal for applying the newly selected charging level, to a corresponding electric charger or a corresponding electric vehicle (EV) charging station terminal. In the case that a corresponding electric vehicle (EV) charging station terminal receives the control signal from electric power demand management system 200, the corresponding electric vehicle (EV) charging station terminal may transmit the received control signal to a corresponding electric charger.

When a new charging level is not selected (No—S816), electric power demand management system 200 may apply (i.e., maintain) a present charging level at step S820.

Meanwhile, at step S822, when the target power proximity degree does not exceed the threshold value (No—S804), electric power demand management system 200 may apply a regular charging condition (e.g., a regular charging level and/or a regular charging price per charging level). In other words, in this case, a target reduction amount may be achieved without performing an electric power usage control procedure (e.g., S806 through S820). Accordingly, in this case, the regular charging condition may be applied.

Figure 9A:
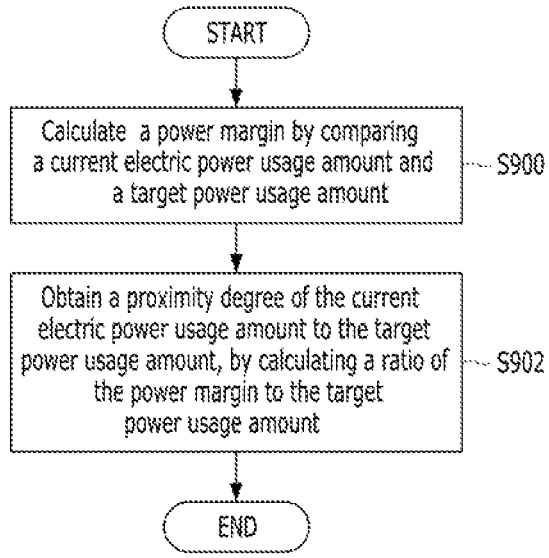
FIG. 9A and FIG. 9B illustrate a method of calculating a proximity degree to a target electric power usage amount in accordance with at least one embodiment.
Figure 9B:
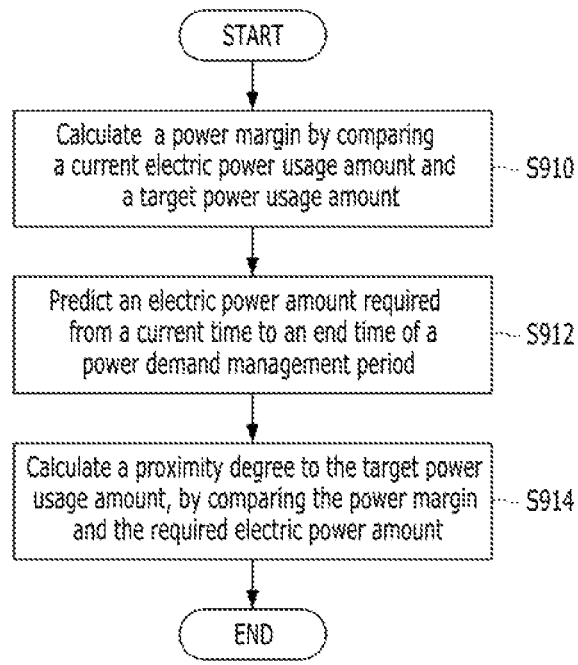

FIG. 9A and FIG. 9B illustrate a method of calculating a proximity degree to a target electric power usage amount in accordance with at least one embodiment. Particularly, FIG. 9A and FIG. 9B illustrate a procedure (S802) of calculating the target power proximity degree described in FIG. 8.

Referring to FIG. 9A, at step S900, electric power demand management system 200 may calculate a power margin by comparing a current electric power usage amount (hereinafter simply referred to as "current power usage amount") and a target power usage amount. Herein, the power margin may be determined as a difference of the current power usage amount and the target power usage amount. The current power usage amount may indicate an accumulated amount of an electric power used from 'a starting time of a power demand management period' to 'a current time' in a corresponding electric vehicle (EV) charging station. A determination procedure of the current power usage amount will be described in more detail with reference to FIG. 12. For example, in the case that a target power usage amount is 100 Kw, and a current power usage amount is 90 kW, a power margin may be 10 kW (=100 kW−90 kW). Meanwhile, the power demand management period may be a period determined by a demand response (DR) event in which the corresponding electric vehicle (EV) charging station has participated. For example, the power demand management period may be determined in a unit of time (e.g., minutes, hours, days, etc.). The current time may indicate a specific time at which a power usage measurement is performed periodically or in real time. As described in FIG. 6 and FIG. 7, the target power usage amount may be determined (or calculated) according to a variety of schemes.

At step S902, electric power demand management system 200 may obtain a proximity degree (hereinafter referred to as "target power proximity degree") of the current power usage amount to the target power usage amount, by calculating a ratio of the power margin to the target power usage amount. For example, the target power proximity degree may be determined by Formula 1 or Formula 2 below.

$$\text{Target power proximity degree [\%]} = [1-(\text{Power margin} \div \text{Target power usage amount})] \times 100 \quad \text{[Formula 1]}$$

$$\text{Target power proximity degree [\%]} = (\text{Power margin} \div \text{Target power usage amount}) \times 100 \quad \text{[Formula 2]}$$

For example, in the above-describe case, i.e., in the case that a target power usage amount is 100 Kw and a current power usage amount is 90 kW, a power margin may be 10 kW (=100 kW−90 kW), and therefore a target power proximity degree may be 90% (=[1−(10 kW/100 kW)]×100).

As shown in Formula 1, as the target power proximity degree obtained by Formula 1 increases, a success possibility of the target power usage amount may decrease. Unlike this, as the target power proximity degree obtained by Formula 2 decreases, a success possibility of the target power usage amount may decrease.

Meanwhile, FIG. 9B illustrates another embodiment for calculating a target power proximity degree.

Referring to FIG. 9B, at step S910, electric power demand management system 200 may calculate a power margin by comparing a current power usage amount (i.e., a current electric power usage amount) and a target power usage amount. For example, the power margin may be determined as a difference of the current power usage amount and the target power usage amount. Herein, the current power usage amount may indicate an accumulated amount of an electric power used from 'a starting time of a power demand management period' to 'a current time' in a corresponding electric vehicle (EV) charging station. A determination procedure of the current power usage amount will be described in more detail with reference to FIG. 12. The power demand management period may be a period determined by a demand response (DR) event in which the corresponding electric vehicle (EV) charging station has participated. For example, the power demand management period may be determined in a unit of time (e.g., minutes, hours, days, etc.). The current time may indicate a specific time at which a power usage measurement is performed periodically or in real time. As described in FIG. 6 and FIG. 7, the target power usage amount may be determined (or calculated) according to a variety of schemes.

At step S912, electric power demand management system 200 may predict an electric power amount required for a specific time period (e.g., from a current time to an end time of a power demand management period). Herein, the required electric power amount (hereinafter referred to as "a predicted power usage amount") may indicate an electric power amount which will be further provided to (i) electric vehicles being currently charged and/or (ii) electric vehicles waiting for charging, for a remaining time of the power demand management period. More specifically, the predicted power usage amount may be predicted based on charging condition information (e.g., charging levels) inputted or predetermined through electric chargers or user equipment (e.g., wireless terminals) by users. A determination of the predicted power usage amount will be described in more detail with reference to FIG. 12.

At step S914, electric power demand management system 200 may calculate a target power proximity degree(i.e., a proximity degree to the target power usage amount), by comparing the power margin and the predicted power usage amount (i.e., the required electric power amount). For example, electric power demand management system 200 may obtain the target power proximity degree by calculating a ratio of 'the required electric power amount' to 'the power margin' as shown in Formula 3 below. Herein, as the target power proximity degree obtained by Formula 3 increases, a success possibility of the target power usage amount may decrease.

$$\text{Target power proximity degree [\%]} = (\text{Predicted power usage amount} \div \text{Power margin}) \times 100 \quad \text{[Formula 3]}$$

For example, in the case that a target power usage amount is 100 Kw and a current power usage amount is 90 kW, a power margin may be 10 kW (=100 kW−90 kW). Furthermore, in this case, if a predicted power usage amount (i.e., a required electric power amount) is 5 kW, a target power proximity degree may be 50% (=(5 kW/10 kW)×100).

Meanwhile, unlike embodiments shown in FIG. 9A and FIG. 9B, a target power proximity degree may be calculated by Formula 4 below.

Target power proximity degree [%]=[(Current power usage amount+Predicted power usage amount) ÷Target power usage amount]×100    [Formula 4]

As described in FIG. 9A and FIG. 9B, in Formula 4, the current power usage amount may indicate an accumulated amount of an electric power used from 'a starting time of a power demand management period' to 'a current time' in a corresponding electric vehicle (EV) charging station.

Figure 10:
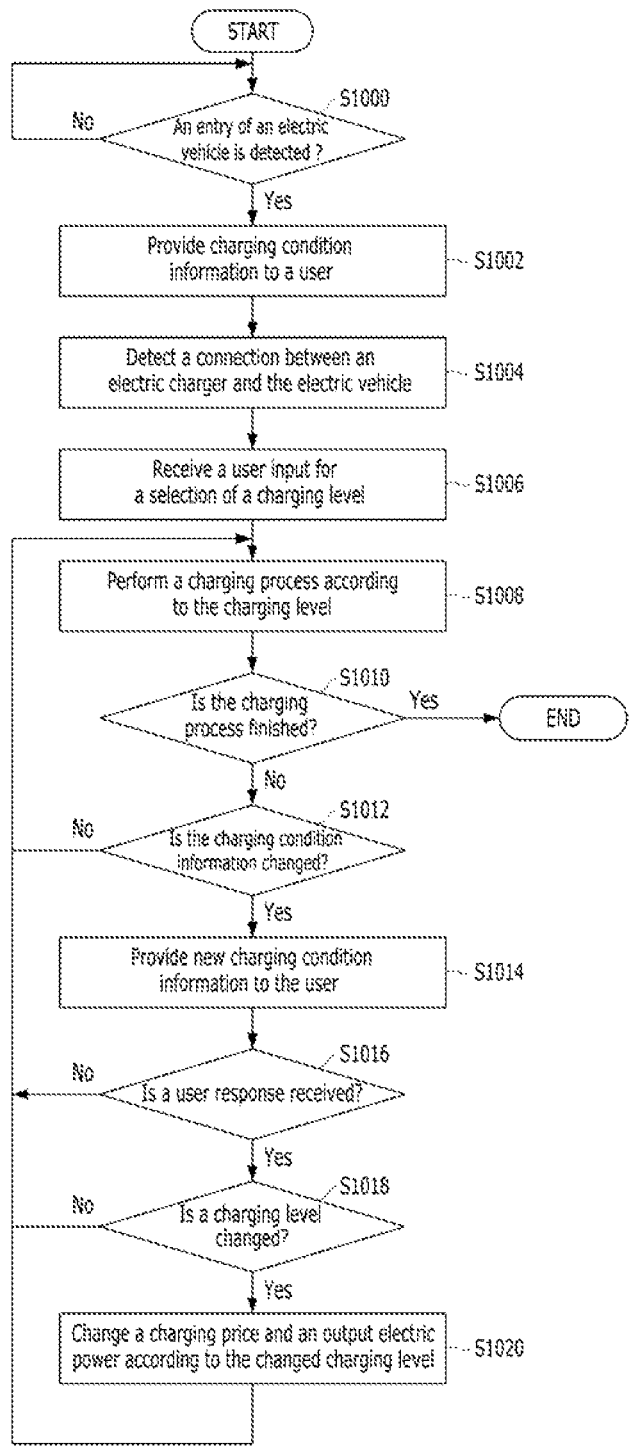
FIG. 10 illustrates a method of charging an electric vehicle in an electric vehicle (EV) charging station in accordance with at least one embodiment.

FIG. 10 illustrates a method of charging an electric vehicle in an electric vehicle (EV) charging station in accordance with at least one embodiment. Particularly, FIG. 10 illustrates a procedure of changing a charging level while the electric vehicle is being charged.

At step S1000, electric power demand management system 200 may obtain information on an entry of an electric vehicle to a charging zone of a corresponding electric vehicle (EV) charging station. For example, one or more sensors deployed in an electric vehicle (EV) charging station may detect an entry of an electric vehicle, and send the detection result (i.e., sensing results) to electric power demand management system 200. Herein, electric power demand management system 200 may perform a power usage management procedure for one or more electric vehicle (EV) charging station.

At step S1002, when an entry of an electric vehicle is detected (Yes—S1000), electric power demand management system 200 may provide charging condition information to a user of the detected electric vehicle such that the user may select one charging level. Herein, the charging condition information may include a charging price per charging level (e.g., charging levels shown in Table 1 above). More specifically, in the case that an electric power usage control procedure according to a demand response (DR) event is performed for a corresponding electric vehicle (EV) charging station, the charging condition information may include a charging price per charging level which is changed according to a proximity degree to a target power usage amount, as described in FIG. 6 through FIG. 9B. Meanwhile, in the case that an electric power usage control procedure according to a demand response (DR) event is not performed, the charging condition information may include regular prices according to regular charging levels. With respect to providing the charging condition information, electric power demand management system 200 may provide the charging condition information through a display screen of an electric charger (e.g., 204a, 204b, . . . , 204n). Furthermore, electric power demand management system 200 may transmit the charging condition information to electric vehicle (EV) charging station terminals (e.g., 300, 310, 320) such that electric chargers (304a, . . . , 304n; 314a, . . . , 314n; 324a, . . . , 324n) of corresponding electric vehicle (EV) charging station 30, 31, and 32 may display the charging condition information. In this case, a corresponding user may select a desired charging level (e.g., level 3 in Table 1) different from a current charging level (e.g., level 1 in Table 1), on the display screen. Alternatively, electric power demand management system 200 may provide (e.g., transmit) the charging condition information using a messaging scheme (e.g., a text message such as an SMS, an email, and so forth) to user equipment.

At step S1004, electric power demand management system 200 may detect a connection between an electric charger and the electric vehicle. More specifically, in the case that the charging condition information is provided, a user of a corresponding electric vehicle may connect a charging plug of a corresponding electric charger to his/her electric vehicle. Alternatively, the user may connect a charging plug of his/her electric vehicle to a corresponding electric charger, according to types of electric vehicles. In other embodiments, a wireless connection for a wireless electric charging may be established by positioning an electric vehicle within a wireless charging zone. When a corresponding electric charger is connected to the corresponding electric vehicle, the corresponding electric charger may transmit a connection signal to electric power demand management system 200. Accordingly, at step S1004, electric power demand management system 200 may detect (or recognize) a connection between an electric charger and the electric vehicle by receiving the connection signal from the corresponding electric charger.

Thereafter, the user may select one charging level among the provided charging levels. In this case, at step S1006, electric power demand management system 200 may receive a user input for a selection of a charging level. For example, electric power demand management system 200 may receive the user input through an electric charger and/or user equipment.

At step S1008, electric power demand management system 200 may perform a charging process according to the selected charging level. More specifically, electric power demand management system 200 may control the corresponding electric charger such that electric power can be provided to the connected electric vehicle. In this case, a charging process to the connected electric vehicle may be performed according to the selected charging level.

At step S1012, electric power demand management system 200 may determine whether the charging condition information (e.g., a charging price per charging level) is changed during the charging process (1008, No—S1010).

When the charging condition information is changed during the charging process (Yes—S1012), electric power demand management system 200 may provide new charging condition information to the user at step S1014. Herein, the new charging condition information may be provided through a display screen of an electric charger, a messaging scheme, and other notification schemes, as described at step S1002.

At step S1016, electric power demand management system 200 may receive a response (i.e., a user response) from the user. Herein, the user response may include information on a newly selected charging level. For example, in the case that user equipment receives a message (i.e., charging condition change notification message) including a new charging condition, user equipment may send a response message (i.e., a response message to the charging condition change notification message) to electric power demand management system 200. Herein, the response message may include information on a different charging level newly selected by a corresponding user. In other embodiment, a user may select a different charging level on a display screen of a corresponding electric charger being providing an electric power to the user's electric vehicle. In this case, the user's selection may correspond to a user response described at S1016. When the user response is not received within a predetermined time (No—S1016), electric power demand management system 200 may perform the charging process (S1008) according to the previously selected charging level (e.g., the charging level selected at step S1006, or the charging level changed at step S1020).

When the user response is received within a predetermined time (Yes—S1016), electric power demand management system 200 may determine whether a charging level is changed (i.e., whether the user selected a new charging level), from the received user response at step S1018.

When a charging level is not changed (No—S1018), electric power demand management system 200 may perform the charging process (S1008) according to the previously selected charging level (e.g., the charging level selected at step S1006, or the charging level changed at step S1020).

When a charging level is changed (Yes—S1018), electric power demand management system 200 may change a currently applied charging level (i.e., a previously selected charging level) to a newly selected charging level at step S1020. In this case, electric power demand management system 200 may perform the charging process (S1008) according to the changed charging level. That is, a changed charging price and/or a changed output electric power may be applied.

Figure 11:
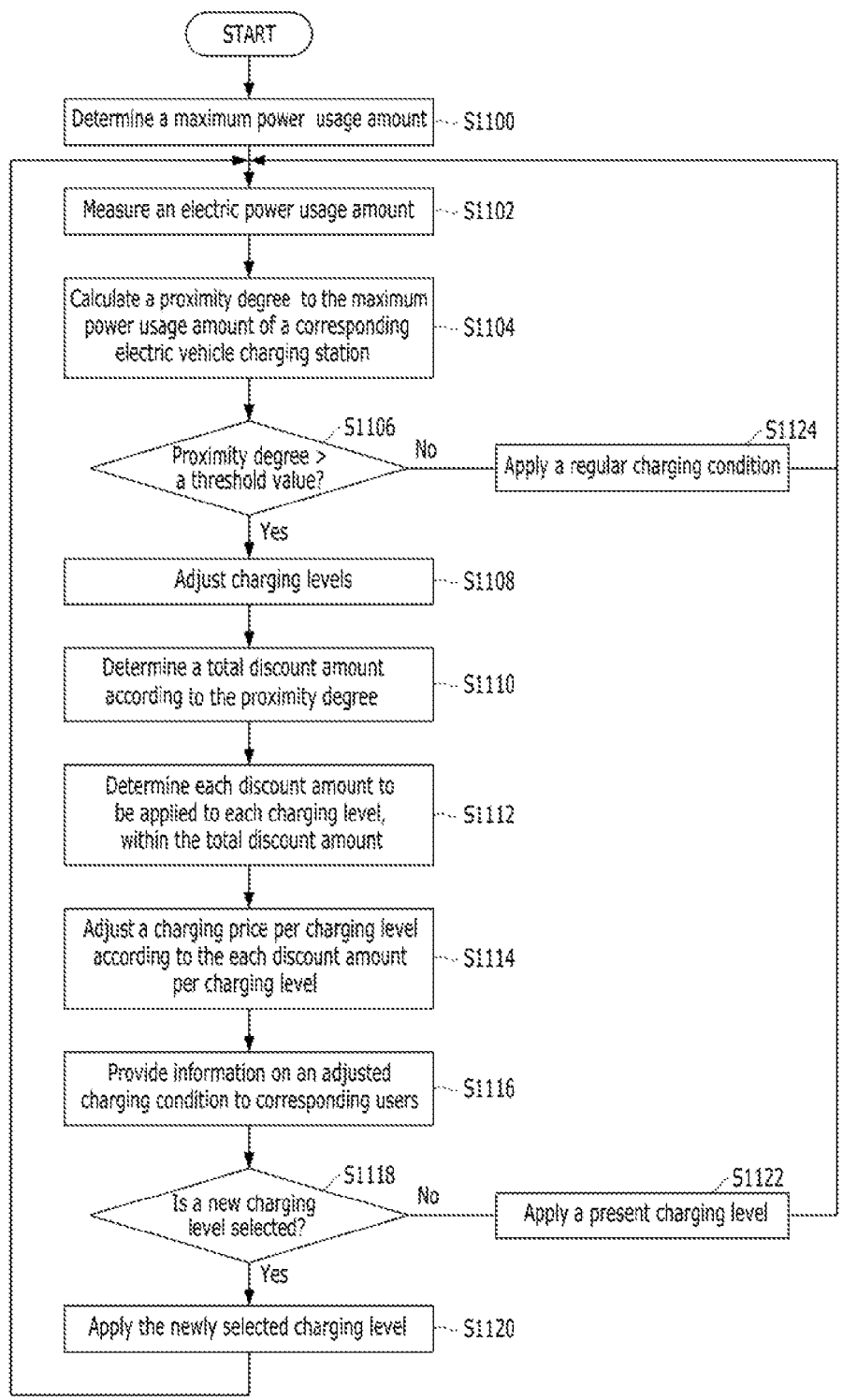
FIG. 11 illustrates a method of preventing a maximum power usage in an electric vehicle (EV) charging station in accordance with at least one embodiment.

FIG. 11 illustrates a method of preventing a maximum power usage in an electric vehicle (EV) charging station in accordance with at least one embodiment. In other words, FIG. 11 illustrates a peak power control procedure. More specifically, such peak power usage prevention may be performed by adjusting a charging condition (e.g., charging levels and/or a charging price per charging level) according to a power use situation in an electric vehicle (EV) charging station.

Referring to FIG. 11, at step S1100, electric power demand management system 200 may determine a maximum power usage amount (may be referred to as "a peak power usage amount") to be managed or controlled. More specifically, electric power demand management system 200 may determine the maximum power usage amount based on a power usage history associated with a corresponding electric vehicle (EV) charging station, regardless of power demand response (DR) events. For example, electric power demand management system 200 may determine the maximum power usage amount as a peak value in at least one past year. Furthermore, in the case that a peak control procedure is separately applied to each EV charging station, the maximum electric power usage amount is separately determined for each EV charging station. Alternatively, in the case that a peak control procedure is through a form of integration applied to a plurality of EV charging stations, the maximum electric power usage amount is determined for all EV charging stations. As employed herein, the term "through a form of integration" refers to operations that might be performed on or for groups, or all, of the referenced devices together and comprehensively.

At step S1102, electric power demand management system 200 may measure an electric power usage amount periodically (e.g., in a unit of 30 minutes) or in real time. In other words, electric power demand management system 200 may monitor periodically or in real time an electric power usage amount in a corresponding electric vehicle (EV) charging station.

At step S1104, electric power demand management system 200 may calculate 'a proximity degree to the determined peak power usage amount' (hereinafter referred to as "peak power proximity degree"). More specifically, electric power demand management system 200 may calculate the peak power proximity degree, based on (i) a power usage tendency according to a real-time power usage and/or (ii) the peak power usage amount. Herein, the peak power proximity degree may indicate a possibility that an actual power usage amount peak may reach the peak power usage amount. The peak power usage amount may be determined based on a power usage history of a corresponding electric vehicle charging station. Furthermore, the peak power proximity degree may be expressed as a numerical value. Particularly, the peak power proximity degree may be used for determining whether a power usage control is required. Such a procedure of calculating the peak power proximity degree was described in more detail with FIG. 9A and FIG. 9B. In this case, the peak power usage amount may be handled to correspond to the target power usage amount described in FIG. 9A and FIG. 9B. In the case that the operation S900 and S910 of determining a current power usage amount is applied, electric power demand management system 200 may use an accumulated current power usage amount (e.g., an accumulated amount of an electric power used from a specific past time to a current time) as the current power usage amount. Alternatively, a real-time electric power usage amount measured at the current time may be used as the current power usage amount. In the case that the operation S912 of predicting a required electric power amount (i.e., a predicted power usage amount) is applied, electric power demand management system 200 may predict an electric power amount required for a specific time period (e.g., from a current time to a specific future time). Particularly, a predicted power usage amount may be predicted in connection with electric vehicles (EVs) which are currently being charged and are waiting for charging. In other embodiments, only a real-time electric power usage amount measured at the current time may be used for a peak power control procedure.

At step S1106, electric power demand management system 200 may determine whether the target power proximity degree exceeds a threshold value. Such determination operation (S1106) may be a procedure of determining whether a power usage of a corresponding electric vehicle (EV) charging station is required to be controlled. Herein, the threshold value may be a predetermined value. Alternatively, the threshold value may be dynamically determined. For example, the threshold value may be dynamically determined based on a power use situation in a corresponding electric vehicle (EV) charging station.

At step S1108, when the target power proximity degree exceeds the threshold value (Yes—S1106), electric power demand management system 200 may adjust (or redetermine) charging levels which are classified based on at least one of a charging time (i.e., a time to be taken for charging), a charging amount (i.e., output electric power for charging), and a waiting time for charging. Herein, an adjustment process of charging levels may include redetermination of charging levels and restriction of a specific charging level. More specifically, in the case that it is determined to be difficult to achieve the peak power usage amount according to the peak power proximity degree, electric power demand management system 200 may restrict a selection of a specific charging level (e.g., a high-speed charging level) at which a charging amount exceeds a specific threshold amount. For example, in the case that a failure possibility of the peak power usage amount is high (e.g., a peak power proximity degree is 80%), electric power demand management system 200 may restrict a selection of a high-speed charging level in a corresponding electric vehicle (EV) charging station. Accordingly, in this case, users can not select the restricted charging level. Meanwhile, in other embodiments, in the case that (i) a peak power proximity degree is 100% or (ii) a power margin is zero ("0"), electric power demand management system 200 may apply a regular charging condition (e.g., a regular charging level and/or a regular charging price per charging level).

At step S1110, electric power demand management system 200 may determine a total discount amount according to the peak power proximity degree. Herein, the total discount amount may be determined in proportion to the peak power proximity degree. In the case that the target power proximity degree is larger, a power usage control for a corresponding electric vehicle (EV) charging station is required to be performed more actively. Accordingly, in this case, the more discount for users may be required to be applied.

At step S1112, electric power demand management system 200 may determine each discount amount to be applied to each charging level, within the total discount amount. For example, a discount amount to be applied to each charging level may be determined in proportion to a charging time of a charging level. In other words, a discount amount to be applied to each charging level may be determined in inverse proportion to a charging amount per unit time (e.g., kWh). In order to induce active participation of users, different discount amounts may be applied to each charging level. Furthermore, if an electric vehicle user waits a predetermined waiting time without charging his/her electric vehicle, electric power demand management system 200 may provide (or apply) an additional discount. For example, in the case that a real-time power usage amount increases rapidly, electric power demand management system 200 may provide an additional discount, in order to minimize a power usage through an active participation of electric vehicle users.

At step S1114, electric power demand management system 200 may adjust (or set) a charging price per charging level according to the each discount amount per charging level. For example, charging prices for a plurality of charging levels may be determined as shown in Table 1 above.

At step S1116, electric power demand management system 200 may provide information on an adjusted (changed) charging condition to corresponding users. Since a procedure of providing the adjusted (changed) charging condition information was already described with reference to FIG. 8 (S814), the detailed description thereof is omitted.

At step S1118, electric power demand management system 200 may determine whether a new charging level is selected. In the case that a new charging condition (i.e., an adjusted charging condition) is provided to corresponding users, each of the corresponding users may transmit selection information to electric power demand management system 200. For example, in the case that user equipment receives a message (i.e., "charging condition change notification message") including a new charging condition, user equipment may send a response message (i.e., a response message to the charging condition change notification message) to electric power demand management system 200. Herein, the response message may include information on a different charging level newly selected by a corresponding user. In other embodiments, each of the corresponding users may select a new charging level on a display screen of a corresponding electric charger.

When a new charging level is selected (Yes—S1118), electric power demand management system 200 may apply the newly selected charging level at step S1120. In other words, electric power demand management system 200 may apply a charging price and an output electric power according to the newly selected charging level. More specifically, electric power demand management system 200 may transmit a control signal for applying the newly selected charging level, to a corresponding electric charger or a corresponding electric vehicle (EV) charging station terminal. In the case that a corresponding electric vehicle (EV) charging station terminal receives the control signal from electric power demand management system 200, the corresponding electric vehicle (EV) charging station terminal may transmit the received control signal to a corresponding electric charger.

When a new charging level is not selected (No—S1118), electric power demand management system 200 may apply (i.e., maintain) a present charging level at step S1122.

Meanwhile, at step S1124, when the peak power proximity degree does not exceed the threshold value (No—S1106), electric power demand management system 200 may apply a regular charging condition (e.g., a regular charging level and/or a regular charging price per charging level). In other words, in this case, a maximum power usage amount may be prevented without performing an electric power usage control procedure (e.g., S1108 through S1122). Accordingly, in this case, the regular charging condition may be applied.

Figure 12:
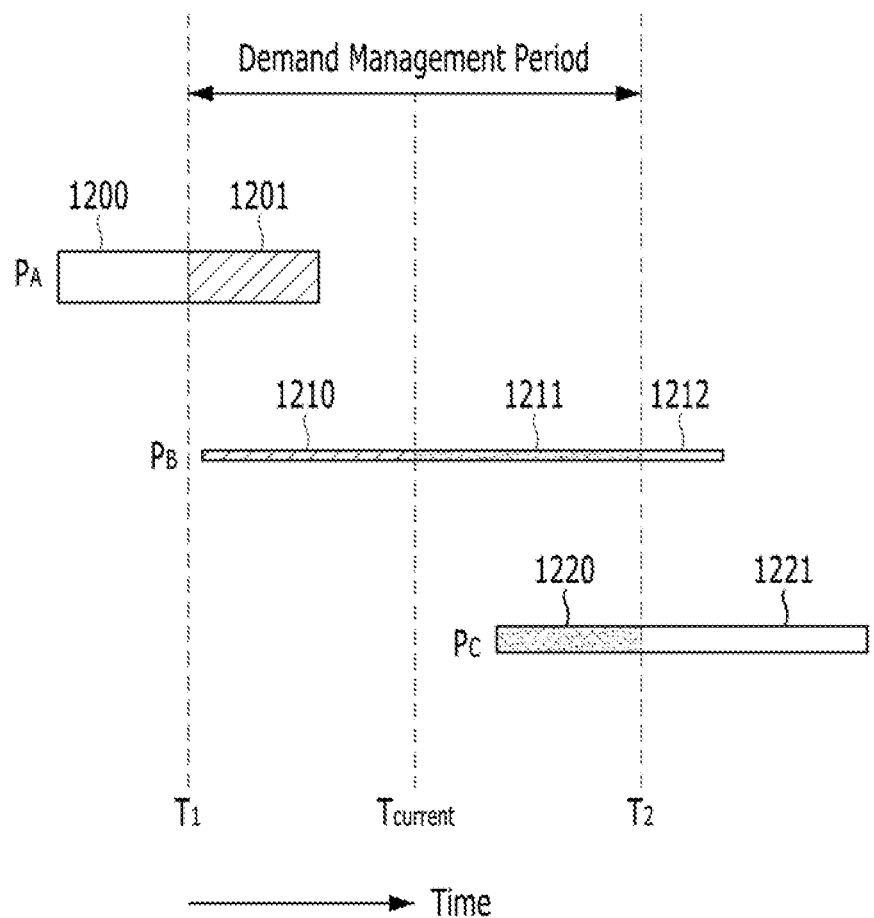
FIG. 12 illustrates determining a current power usage amount and a predicted power usage amount in accordance with at least one embodiment.

FIG. 12 illustrates determining a current power usage amount and a predicted power usage amount in accordance with at least one embodiment. Particularly, FIG. 12 illustrates a determination procedure (S900 and S910) of the current power usage amount, and a determination procedure (S912) of the predicted power usage amount.

As shown in FIG. 12, at the current time ($T_{current}$), (i) charging of electric vehicle 'A' is already finished, (ii) electric vehicle 'B' is being charged, and (iii) electric vehicle 'C' is waiting for charging. "$T_1$" indicates a starting time of a demand manage period, and "$T_2$" indicates an end time of a demand manage period. $P_A$, $P_B$, and $P_C$ may indicate a power usage amount of electric vehicles A, B, and C, respectively. The 'thickness' of a power usage amount 'bar' may indicated a charging amount per unit time. The 'length' of a power usage amount 'bar' may indicated a charging time.

The current power usage amount may indicate an accumulated amount of an electric power used from 'a starting time ($T_1$) of a demand management period' to 'a current time ($T_{current}$)' in a corresponding electric vehicle (EV) charging station. For example, a current power usage amount in FIG. 12 may be a sum of power usage amount 1201 and power usage amount 1210. Power usage amount 1200 is not included in the current power usage amount since power usage amount 1200 is out of the demand management period.

Meanwhile, the predict power usage may indicate a power usage amount required for a specific time period, i.e., from a current time ($T_{current}$) to an end time ($T_2$) of a power demand management period). More specifically, the predicted power usage amount may indicate an electric power amount which will be further provided to (i) electric vehicles (e.g. electric vehicle 'B') being currently charged and (ii) electric vehicles (e.g., electric vehicle 'C') waiting for charging, for a remaining time ($T_2$-$T_{current}$) of the demand management period. Furthermore, the predicted power usage amount may be predicted based on charging condition information (e.g., charging levels, a charging time, a charging amount). Particularly, power usage amount may be calculated by multiplying a corresponding output electric power (i.e., a charging amount for a unit time) by a predicted charging time. For example, a predicted power usage amount in FIG. 12 may be a sum of power usage amount 1211 and power usage amount 1220. Power usage amount 1212 and power usage amount 1221 are not included in the predicted power usage amount since power usage amount 1212 and power usage amount 1221 are out of the demand management period.

As described above, the present embodiment may treat electric power used for charging electric vehicles as demand response (DR) resources (or load management resources). Accordingly, it is possible to efficiently manage an electric power demand in one or more electric vehicle (EV) charging stations, and to contribute a national energy demand management policy. Furthermore, it is possible to resolve an instability of an electric power demand/supply due to an increase in electric power demand for charging electric vehicles.

In addition, the present embodiment may participate in a demand response (DR) event with electric power (more specifically, a target reduction amount) of an electric vehicle (EV) charging station, and provide discounts with grants received for participating the DR event. Accordingly, it is possible to induce consumers to actively participate in the DR event, and to meet the target reduction amount.

As described above, the present embodiment may provide a variety of charging levels and a variable pricing rate in which a discount benefit is reflected, based on an electric power usage (e.g., a real-time electric power usage) at one or more electric vehicle (EV) charging stations. Accordingly, users of an electric vehicle (EV) charging station may have wide options to conveniently and economically choose a charging level. Furthermore, the present embodiment may enable an electric vehicle (EV) charging station to efficiently control an electric power usage amount, and may enable an operating entity of an electric vehicle (EV) charging station to earn an additional profit (e.g., rewards) according to a demand response (DR) event. Meanwhile, the present embodiment may enable users of electric vehicle (EV) charging stations to charge their electric vehicles at a lower charging price with the discount.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of managing an electric power demand in one or more electric vehicle (EV) charging stations, the method comprising:
   determining, by an electric power demand management system including at least one hardware processor, a target power usage amount for the one or more EV charging stations;
   determining, by the electric power demand management system, whether an electric power usage control is required, based on the target power usage amount and an electric power usage amount in the one or more EV charging stations; and
   adjusting, by the electric power demand management system, a charging condition including charging levels and a charging price per charging level when the electric power usage control is required.

2. The method of claim 1, wherein:
   the target power usage amount is applied for a demand management period associated with a demand response (DR) event; and
   the electric power usage amount includes at least one of an accumulated current power usage amount and a predicted power usage amount.

3. The method of claim 2, wherein the determining the target power usage amount includes:
   determining a reference power demand amount based on an electric power usage history of the one or more EV charging stations;
   determining a target reduction amount for the one or more EV charging stations; and
   determining the target power usage amount by obtaining a difference between the reference power demand amount and the target reduction amount.

4. The method of claim 3, wherein the reference power demand amount is determined according to a customer baseline load (CBL) scheme.

5. The method of claim 3, wherein the determining the target reduction amount includes:
   determining a reduction amount based on the reference power demand amount if a demand response (DR) event is received;
   participating in a bidding process associated with the demand response (DR) event, using the reduction amount; and
   determining the target reduction amount as the reduction amount when receiving a successful bidding result from a demand management market operating system.

6. The method of claim 3, wherein the determining the target reduction amount includes:
   predetermining the target reduction amount to be applied for a specific time period in connection with a demand management market operating system.

7. The method of claim 2, wherein in a case that the electric power demand is applied for two or more EV charging stations,
   the target power usage amount and the electric power usage amount are determined as one value for all of the two or more EV charging stations.

8. The method of claim 2, wherein the determining whether the electric power usage control is required includes:
   measuring an accumulated current power usage amount within the demand management period, for the one or more EV charging stations; and
   determining a necessity of the electric power usage control according to a proximity degree between the target power usage amount and the accumulated current power usage amount.

9. The method of claim 8, wherein the proximity degree is determined based on a power margin calculated from a difference between the accumulated current power usage amount and the target power usage amount.

10. The method of claim 2, wherein the determining whether the electric power usage control is required includes:
    calculating a power margin from a difference between an accumulated current power usage amount and the target power usage amount;
    predicting the predicted power usage amount to be provided to a current charging electric vehicles and a waiting electric vehicle from a current time to an end time of the demand management period;
    determining a proximity degree by comparing the power margin and the predicted power usage amount; and
    determining a necessity of the electric power usage control according to the proximity degree.

11. The method of claim 2, wherein the adjusting includes:
    adjusting the charging condition according to a proximity degree of the electric power usage amount to the target power usage amount,
    wherein (i) a total discount amount to be applied to the one or more EV charging stations is determined based on the proximity degree, and (ii) the charging levels are classified based on at least one of a charging time, a charging amount per unit time, and a waiting time for charging.

12. The method of claim 11, wherein the adjusting includes:
    adjusting the charging price per charging level, based on an expected demand response (DR) event profit such that a discount amount for each charging level is proportion to a corresponding charging time and is inverse proportion to a charging amount per unit time; and
    restricting a selection of a specific charging level at which a charging amount exceeds a specific threshold amount.

13. The method of claim 1, wherein:
    the target power usage amount is a maximum electric power usage amount; and
    the target power usage amount is periodically measured.

14. The method of claim 13, wherein the maximum electric power usage amount is determined based on a power usage history for the one or more EV charging stations.

15. The method of claim 13, wherein the maximum electric power usage amount is:
    (i) separately determined for each EV charging station, or
    (ii) determined through a form of integration for all of the one or more EV charging stations.

16. The method of claim 1, further comprising:
    controlling at least one of a corresponding electric charger and a corresponding EV charging station terminal to apply a newly selected charging level, if a new user selection associated with the adjusted charging condition is received.

17. A system for managing an electric power demand in one or more electric vehicle (EV) charging stations, the system comprising:

a demand response (DR) event management processor configured to determine a target power usage amount associated with a demand response (DR) event for the one or more EV charging stations;

a power usage management processor configured to determine whether an electric power usage control is required, based on the target power usage amount and an electric power usage amount in the one or more EV charging stations; and a charging condition setting processor configured to adjust a charging condition including charging levels and a charging price per charging level when the electric power usage control is required.

18. The system of claim 17, wherein in a case that a new user selection associated with the adjusted charging condition is received, the power usage management processor is configured to control at least one of a corresponding electric charger and a corresponding EV charging station terminal to apply the new user selection.

19. The system of claim 17, wherein:

the target power usage amount is applied for a demand management period associated with the demand response (DR) event; and the electric power usage amount includes at least one of an accumulated current power usage amount and a predicted power usage amount.

20. The system of claim 19, wherein the demand response (DR) event management processor is configured to:

determine a reference power demand amount based on an electric power usage history of the one or more EV charging stations;

determine a target reduction amount for the one or more EV charging stations; and determine the target power usage amount by obtaining a difference between the reference power demand amount and the target reduction amount.

21. The system of claim 19, wherein the power usage management processor is configured to:

measure an accumulated current power usage amount within the demand management period, for the one or more EV charging stations; and determine a necessity of the electric power usage control according to a proximity degree between the target power usage amount and the accumulated current power usage amount.

22. The system of claim 19, wherein the power usage management processor is configured to:

calculate a power margin from a difference between an accumulated current power usage amount and the target power usage amount;

predict the predicted power usage amount to be provided to a current charging electric vehicle and a waiting electric vehicle from a current time to an end time of the demand management period;

determine a proximity degree by comparing the power margin and the predicted power usage amount; and determine a necessity of the electric power usage control according to the proximity degree.

* * * * *